United States Patent [19]
Phillips

[11] Patent Number: 5,755,097
[45] Date of Patent: May 26, 1998

[54] BOOTSTRAP POWER STEERING SYSTEMS

[75] Inventor: Edward H. Phillips, Troy, Mich.

[73] Assignee: Techco Corporation, Southfield, Mich.

[21] Appl. No.: 604,722

[22] Filed: Feb. 21, 1996

Related U.S. Application Data

[63] Continuation-in-part of Ser. No. 585,806, Jan. 16, 1996, abandoned, which is a continuation-in-part of Ser. No. 322,448, Oct. 5, 1994, Pat. No. 5,505,275, which is a continuation of Ser. No. 119,281, Sep. 9, 1993, abandoned, which is a continuation-in-part of Ser. No. 99,167, Jul. 29, 1993, Pat. No. 5,435,698.

[51] Int. Cl.$^6$ ................... F15B 9/04; F15B 9/10
[52] U.S. Cl. ................... 60/431; 60/450; 60/468; 91/375 A
[58] Field of Search ............ 137/596.13; 60/431, 60/450, 468; 91/375 A

[56] References Cited

U.S. PATENT DOCUMENTS

| | | | |
|---|---|---|---|
| 3,411,416 | 11/1968 | Herd et al. | 91/451 |
| 3,455,210 | 7/1969 | Allen | 137/596.13 X |
| 3,488,953 | 1/1970 | Haussler | 137/596.13 X |
| 4,037,620 | 7/1977 | Johnson | 137/596 |
| 4,139,021 | 2/1979 | Ailshie et al. | |
| 4,385,674 | 5/1983 | Presley | 91/516 X |
| 5,018,432 | 5/1991 | White, Jr. | |
| 5,131,486 | 7/1992 | Kato et al. | |
| 5,207,780 | 5/1993 | Norimatsu et al. | |
| 5,213,174 | 5/1993 | Adams | |
| 5,305,604 | 4/1994 | Phillips | 91/375 R X |
| 5,396,969 | 3/1995 | Joerg et al. | |
| 5,505,275 | 4/1996 | Phillips | 60/431 X |

*Primary Examiner*—Gerald A. Michalsky
*Attorney, Agent, or Firm*—Gifford, Krass, Groh, Sprinkle, Patmore, Anderson & Citkowski, P.C.

[57] ABSTRACT

Methods and apparatus for improving control of pressurized fluid flow through bootstrap power steering systems are disclosed. In particular, the methods include differentially measuring control pressure across internal flow control orifices as directly as possible. Differential control pressure measurements are made between Kelvin supply, or return, pressure values and a control pressure port of a control valve. In addition, methods and apparatus for improved speed sensitive control of steering assist and/or driver selectable steering effort are also disclosed. One of the methods comprises an extension of the method of differentially measuring control pressure across the internal flow control orifices wherein a range of control pressures are enabled. In addition, a method of improving low speed tactile steering feel wherein an electronically variable orifice is activated in order to provide additional fluid flow thereby increasing "on-center" hydraulic pressure gain is disclosed.

8 Claims, 16 Drawing Sheets

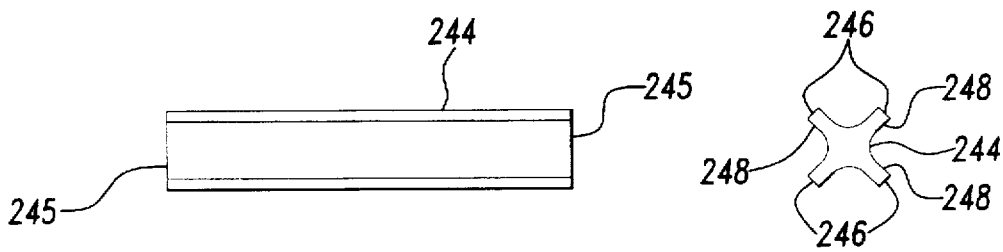

PROVIDE A FLOW OF PRESSURIZED FLUID TO A SERVO MOTOR DRIVEN BOOTSTRAP POWER STEERING SYSTEM COMPRISING A MULTI-DIMENSIONAL LOOKUP TABLE OF COMMAND SYSTEM CONTROL PRESSURE VALUES THEREFOR COMPRISING MEASURED ROTATIONAL SPEED AND/OR CURRENT VALUES AS INPUTS THERETO

MEASURE INSTANT SYSTEM CONTROL PRESSURE VALUE

MEASURE INSTANT SERVO MOTOR ROTATIONAL SPEED VALUE

AND/OR

MEASURE INSTANT SERVO MOTOR CURRENT VALUE

PICK AN INSTANT COMMAND SYSTEM CONTROL PRESSURE VALUE FROM THE LOOKUP TABLE

COMPARE THE INSTANT COMMAND SYSTEM CONTROL PRESSURE VALUE WITH THE MEASURED INSTANT SYSTEM CONTROL PRESSURE VALUE TO FORM AN ERROR SIGNAL REPRESENTING THE DIFFERENCE THEREBETWEEN

APPLY A DRIVE SIGNAL TO THE SERVO MOTOR SELECTED TO APPROPRIATELY REDUCE THE ERROR SIGNAL

Fig-12

BOOTSTRAP POWER STEERING SYSTEMS

CROSS-REFERENCE TO RELATED APPLICATION

This application is a Continuation-in-Part of Ser. No. 08/585,806, filed Jan. 16, 1996, now abandoned, which is a Continuation-in-Part of Ser. No. 08/322,448, filed Oct. 5, 1994, issued as U.S. Pat. No. 5,505,275, which is a Continuation of Ser. No. 08/119,281, filed Sep. 9, 1993, now abandoned, which is a Continuation-in-Part of Ser. No. 08/099,167, filed Jul. 29, 1993, issued as U.S. Pat. No. 5,435,698.

BACKGROUND OF THE INVENTION

I. Field of the Invention

The present invention relates generally to bootstrap hydraulic systems and, more particularly, to flow and speed sensitive steering control methods and apparatus for enhancing such systems for use in vehicular power steering systems.

II. Description of the Prior Art

Bootstrap hydraulic systems emulate the action of a hydraulic system comprising a four-way control valve. They have a supply line delivering pressurized fluid to a supply port and a return line returning spent fluid from a return port. They also have first and second output ports for delivering differential load pressure and flow from their control valves to some form of hydraulic motor. However, in addition to regulating differential load pressure by internal pressure control orifices, the control valves of bootstrap hydraulic systems are configured such that fluid flow therethrough is regulated in a demand fashion by internal flow control orifices.

In bootstrap hydraulic systems adapted for use in vehicular power steering systems it is known to maintain a selected pressure value at a control port of the system's control valve. This is done with the purpose of maintaining a constant pressure drop, known hereinafter as control pressure, across the internal flow control orifices. If this can truly be accomplished, resulting flow through the control valve is proportional to the product of the internal flow control orifice area and the square root of control pressure. Thus, maintaining a nominally constant control pressure value across the internal flow control orifices enables fluid flow values through the control valve which are substantially proportional to the instant internal flow control orifice area. In the case of a vehicular power steering system, this area is determined by relative rotational displacement of a spool shaft with respect to a valve sleeve against restraint provided by a torsion bar and is thus a selected function of applied hand wheel torque. In practice this has worked well when the fluid is at, or above, normal room temperature. On the other hand, parasitic viscous pressure loses have made it difficult to achieve the desired nominally constant control pressure values at lower temperatures. What is needed is a method and control valve hardware for enabling direct differential measurement and control of the desired nominally constant control pressure values across the internal flow control orifices regardless of environmental conditions.

It would be desirable to enhance operation at very cold temperatures. While this is a problem for any hydraulic system, the topology of bootstrap systems present unique opportunities for such enhancement. The problem is to provide selected fluid flow values through the control valve whereby the control valve's operational pressure-effort characteristics are consistent regardless of instant temperature values. What is needed are methods and control valve hardware enabling selected increased control pressure values across the internal flow control orifices as a function of temperature. In addition (as will be explained below), certain of the methods and hardware of the present invention are useful in implementing speed sensitive control of steering assist as well as driver selectable steering effort.

It is possible to implement any one of many permutations of the bootstrap technology in configuring a bootstrap power steering system. For instance, high side or low side control pressure can respectively be obtained via juxtaposing the internal flow control orifices to either the supply side or the return side. In one type of system, the control valve comprises both an open-center load pressure control orifice bridge and separate flow control orifices. Alternately in another type of control valve, either set of high or low side orifices is configured in a nominally closed-center manner and utilized for flow control while the other set is configured in an open-center manner and utilized for pressure control. In this case the first and second output ports are respectively coupled to first and second input ports of a three-way valve. The remaining output port of the three-way valve issues an appropriate high or low side pressure signal.

It is known to configure bootstrap hydraulic systems for use in vehicular power steering systems with a series arrangement of opening and closing secondary pressure control orifices in order to generate substantially linear pressure-effort tactile characteristics. This is necessary in order to compensate for increasing fluid flow values realized as torque is applied to the system control valve.

Systems may either be configured as hydro-mechanical systems wherein a bypass pressure control valve is used to implement the flow control, or as electro-hydro-mechanical systems wherein instant values of the control pressure are measured and an electronically activated servo system is used to implement the flow control by suitably varying pump speed.

It is also known to configure bootstrap hydraulic systems as speed sensitive power steering systems. Such system configuration has been accomplished via suitably varying pump speed, or inclusion of a solenoid operated valve controlling flow through a bypass fluid flow circuit. In one case, low speed operation of such a solenoid operated valve enabled speed sensitive power steering system has been enhanced by configuring the solenoid operated valve as a three-way valve whereby supplemental fluid flow through the host system's pressure control orifices increases at lower vehicular speeds. However, topologies associated with these enhanced control valves has become rather complex. What is needed is a new control valve topology for a further enhanced speed sensitive bootstrap power steering system which is significantly simpler than that previously known, and in particular, involves fewer grooves, slots, orifices and ports in its spool shaft and valve sleeve elements.

SUMMARY OF THE INVENTION

The present invention provides flow control methods and apparatus for enabling more accurately determined fluid flow through a control valve for a bootstrap hydraulic system than in prior art bootstrap hydraulic systems, implementing a new method of achieving speed sensitive control of steering assist, and in general, fulfilling the above-mentioned requirements.

In brief, the flow control methods and apparatus of the present invention operate in conjunction with control valves used in bootstrap hydraulic systems as disclosed in greater detail in my U.S. Pat. Nos. 5,305,604 entitled "Control Valve for Bootstrap Hydraulic Systems" and 5,435,698 entitled "Bootstrap Power Steering Systems", and co-pending U.S. patent application Ser. Nos. 08/119,281, filed Sep. 9, 1993, now abandoned, entitled "Improved Boot Strap Power steering Systems" and 08/322,448, filed Oct. 5, 1994, now U.S. Pat. No. 5,505,275, entitled "Power Steering System" all of which are incorporated herein by reference.

The common feature of the embodiments of the present invention is apparatus enabling differential measurement of the control pressure across the internal flow control orifices as directly as possible. For instance, in the case of high side control pressure, differential control pressure measurement is obtained between a supplemental port connected to the input groove of the valve sleeve (which provides a Kelvin supply pressure value) and a control pressure port. In the case of low side control pressure, the differential control pressure measurement is obtained between the control pressure port and a supplemental port formed in the valve housing (which provides a Kelvin return pressure value). In either case, this avoids any pressure drops occurring in the various fittings and delivery lines and, except for parasitic pressure losses within the valve elements themselves, results in substantially accurate differential pressure measurement of the pressure drop across the flow control orifices.

In a preferred embodiment, high side control pressure is derived from a shuttling ball three-way valve used to pick off the higher of the instant pressure values present in the first and second output ports and applied to a control end of a pressure control piston. High side control pressure is derived from control fluid flowing from a supplemental input groove port to a high pressure biasing end of the pressure control piston and through a flow limiting orifice to the control end of the pressure control piston. The control fluid then flows thorough a time constant control orifice to the shuttling ball three-way valve.

A biasing compression spring of known stiffness is also applied to the control end of the pressure control piston. A position transducer is used to measure instant positional values of the pressure control piston and a servo system comprising an amplifier and servo motor is used to suitably drive a pump to maintain the control pressure, and therefore the bypass pressure control piston position, at their selected values. Servo motor speed control is provided by a drive circuit controlling servo motor rotational speed as a selected function of pressure control piston position.

Normally, all available servo motor speeds, down to a zero value, are achieved at pressure control piston positions whereat an associated bypass return port is closed. As a fail-safe backup, should the servo motor speed control fail in an excessive speed condition, the pressure control piston is forced back to a position where it partially uncovers the bypass return port in order to direct resulting excess fluid flow back to a reservoir.

Speed sensitive control of steering assist and/or driver selectable steering effort is provided by extending the positional values of the pressure control piston with reference to the stiffness of the biasing compression spring in order to provide a range of control pressure set point values. In addition, improved low speed operation of the speed sensitive control of steering assist is provided by an electronically variable orifice (hereinafter referred to as an EVO). When the EVO is activated at low vehicular speeds it provides additional fluid flow to internal pressure control orifices thereby increasing hydraulic pressure gain.

In a first alternative preferred embodiment, low side control pressure is derived directly from dedicated flow control orifices via a flow control groove in the valve sleeve and a flow control port in the valve housing. The low side control pressure is applied to a control end of a pressure control piston via control fluid flowing through a time constant control orifice. The control fluid then flows through a flow limiting orifice and applied to the biasing end of the pressure control piston. Finally, the control fluid flows through a capillary tube to a supplemental valve housing port. A biasing compression spring is also applied to the biasing end of the pressure control piston. An engine driven pump is used to provide pressurized fluid flow to both the central groove of the pressure control piston and the input groove of the valve sleeve. Generally, the pressure control piston is forced back to a position where it partially uncovers a bypass return port in order to direct excess flow back to a reservoir. Low temperature enhancement is obtained when the fluid viscosity increases to the point where pressure drop through the capillary tube becomes comparable to that associated with the flow limiting orifice.

Speed sensitive control of steering assist is provided via inclusion of a three-way solenoid operated valve as described in incorporated U.S. patent application Ser. No. 08/322,448, now U.S. Pat. No. 5,505,275. As explained in U.S. patent application Ser. No. 08/322,448, now U.S. Pat. No. 5,505,275, the three-way solenoid operated valve comprises a valve spool and sleeve set having low and high speed controlled orifices. The low speed controlled orifice is used to provide supplemental fluid flow in parallel with the flow control orifices and the high speed controlled orifice is used to enable a bypass flow circuit disposed in parallel with the pressure control orifices of the control valve. Whenever the solenoid is completely deactivated at high vehicular speeds, a bias spring positions the valve spool such that the low speed controlled orifice is completely closed and the high speed controlled orifice is fully open. Conversely, whenever the solenoid is fully activated, such as during parking, the bias spring is overcome by the solenoid and the valve spool is positioned such that the high speed controlled orifice is completely closed and the low speed controlled orifice is fully open. As the vehicle speed increases or decreases, the percentage on time of a pulse width modulated (PWM) signal to the solenoid is varied in a preselected manner to effect a smooth transition between these two extremes.

In a second alternative preferred embodiment, the series arrangement of opening and closing secondary pressure control orifices is fluidly disposed between an input port and an additional valve sleeve groove in order to provide a high speed bypass path around the closing ones of the control valve's pressure control orifices. This enables use of a three-way solenoid operated valve identical in operation to the three-way solenoid operated valve mentioned above. In the second alternative preferred embodiment, overall control valve topology is considerably simpler than previously known fully speed sensitive bootstrap power steering system control valve topologies. In addition, a greater linear range of the control valve's pressure-effort characteristic is provided by reducing the metering ramp angle of the opening secondary pressure control orifices. And, still further enhanced speed sensitive steering and pressure-effort capabilities are achieved by combining the topology of the second alternative preferred embodiment with the flow control method and apparatus teachings of the preferred embodiment of the present invention.

The above embodiments comprise examples of the utilization of both high and low side derived control pressure.

Control valves comprising both an open-center orifice bridge and separate flow control orifices, and an orifice bridge comprising one set of nominally closed-center flow control orifices and another set of open-center pressure control orifices are disclosed. Alternate series opening and closing secondary pressure control orifice topologies for achieving linearized high speed operation are disclosed. Further, both hydro-mechanical and electro-hydromechanical system operation are described. Two types of low temperature enhancement and two types of speed sensitive control of steering assist are disclosed. Because other combinations of these six system variations could be configured to the extent of 64 possible preferred embodiments, the scope of the present invention is not limited to the particular combinations of features comprised in the above mentioned preferred, and first and second alternative preferred embodiments.

BRIEF DESCRIPTION OF THE DRAWINGS

The foregoing and other objects and advantages of the present invention will become readily apparent to those skilled in the art upon studying the following detailed description, when considered in connection with the accompanying drawings, in which:

FIGS. 10A and 10B are plan and end views of a control rod used in the three-way valve depicted in FIG. 6B;

FIG. 12 is a flow chart depicting a method of achieving selected pressure-effort characteristics for control valves used in the second alternative preferred embodiment of the present invention.

DETAILED DESCRIPTION OF THE PREFERRED EMBODIMENTS

Figure 1A:
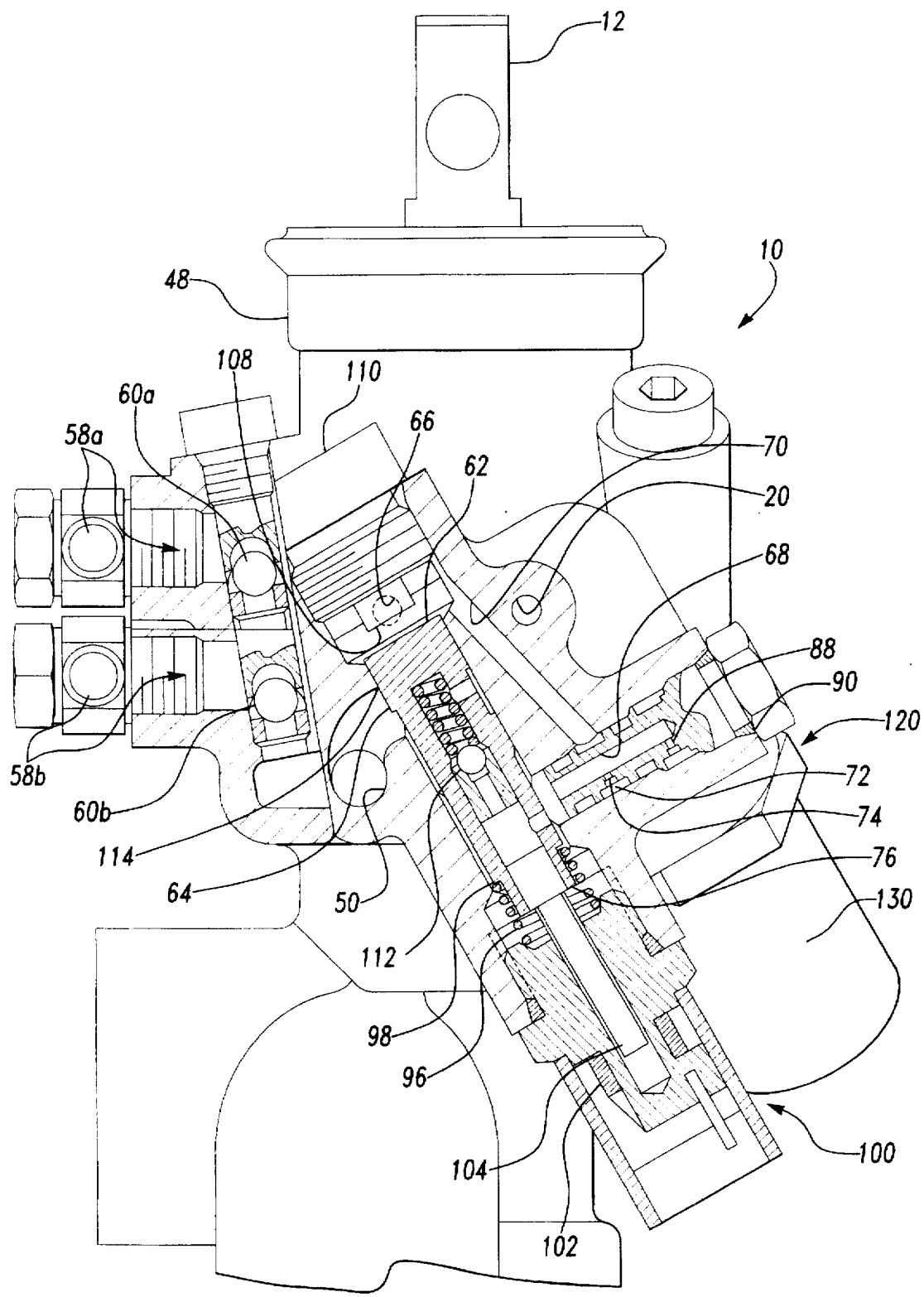
FIG. 1A is a sectional view of pressure control and check valve portions of a control valve used in a preferred embodiment of the present invention.
Figure 1B:
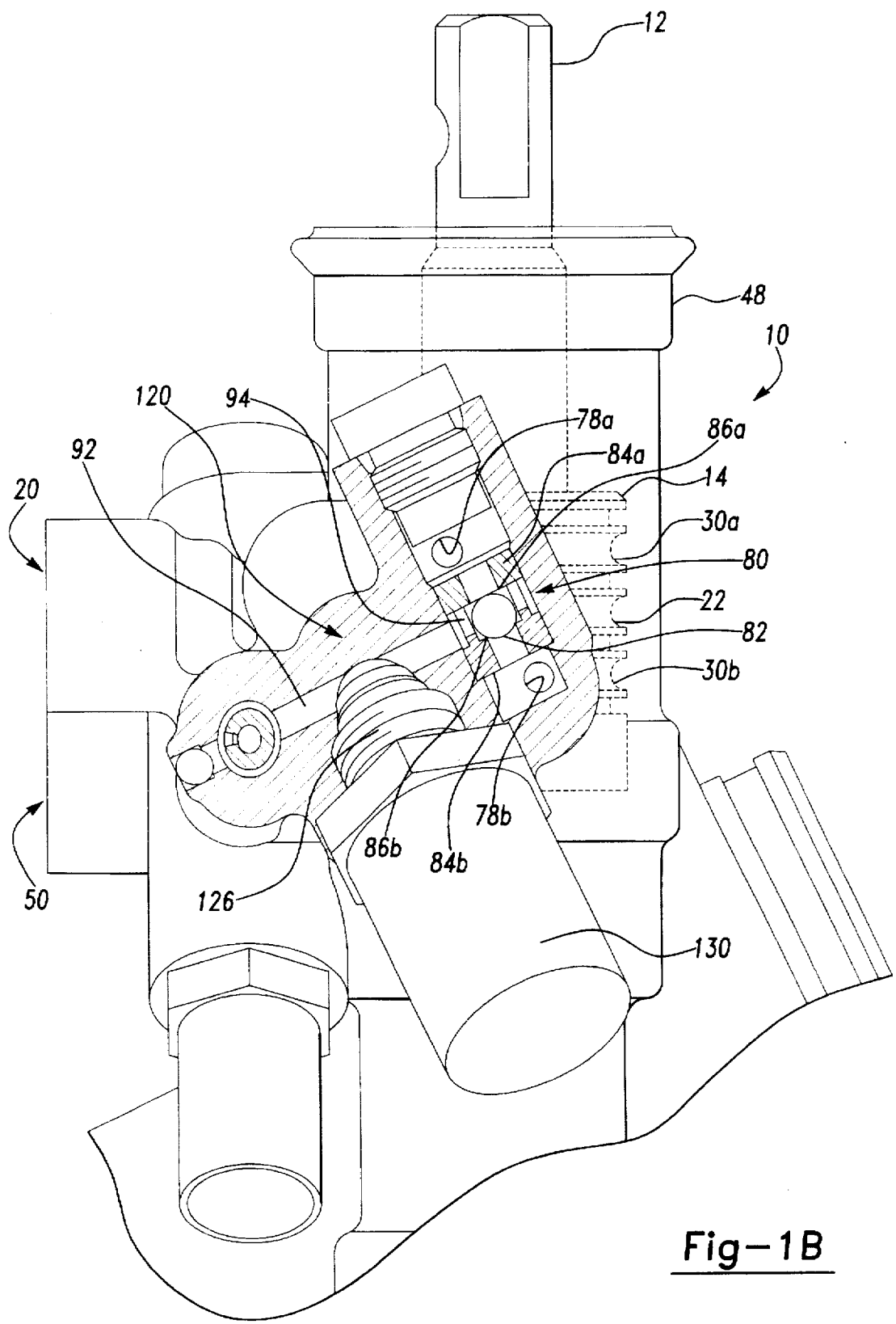
FIG. 1B is a sectional view of a shuttling ball three-way valve used in the preferred embodiment of the present invention.
Figure 1C:
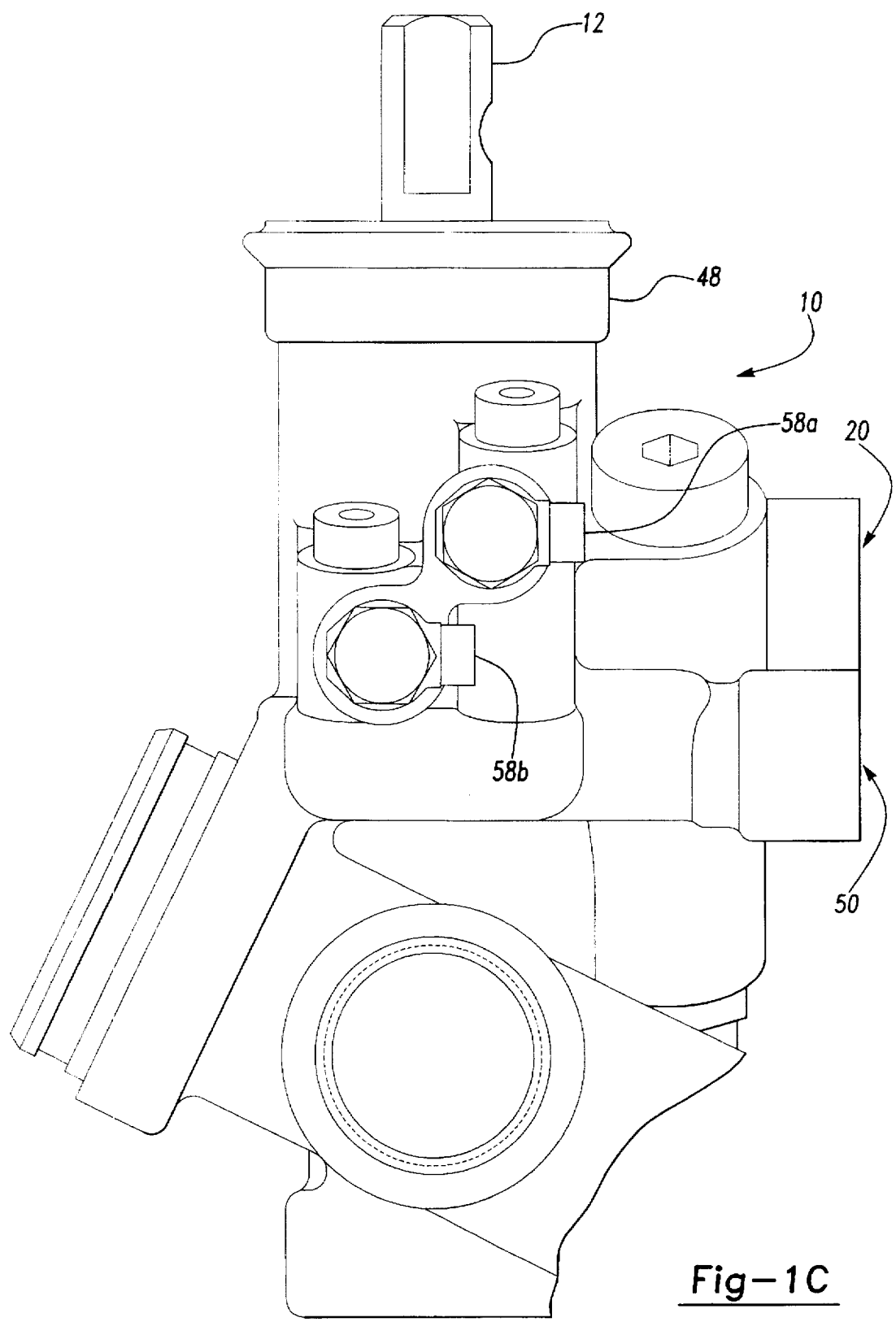
FIG. 1C is a plan view of the output port side of the control valve used in the preferred embodiment of the present invention.

Shown in FIGS. 1A, 1B and 1C is a bootstrap power steering valve 10 constructed generally according to the teachings of incorporated U.S. Pat. Nos. 5,305,604 and 5,435,698, and U.S. patent application Ser. Nos. 08/119,281, now abandoned, and 08/322,448, now U.S. Pat. No. 5,505,275. Specifically, bootstrap power steering valve 10 comprises high side control pressure such as is disclosed in FIGS. 4A and 4B of U.S. Pat. No. 5,435,698. In addition, bootstrap power steering valve 10 comprises parasitic bypass slots similar to a combination of primary parasitic slots 414a/b and secondary parasitic slots 413a/b of control valve 411 shown in FIGS. 16A through 18F of U.S. Pat. No. 5,435,698.

Figure 2:
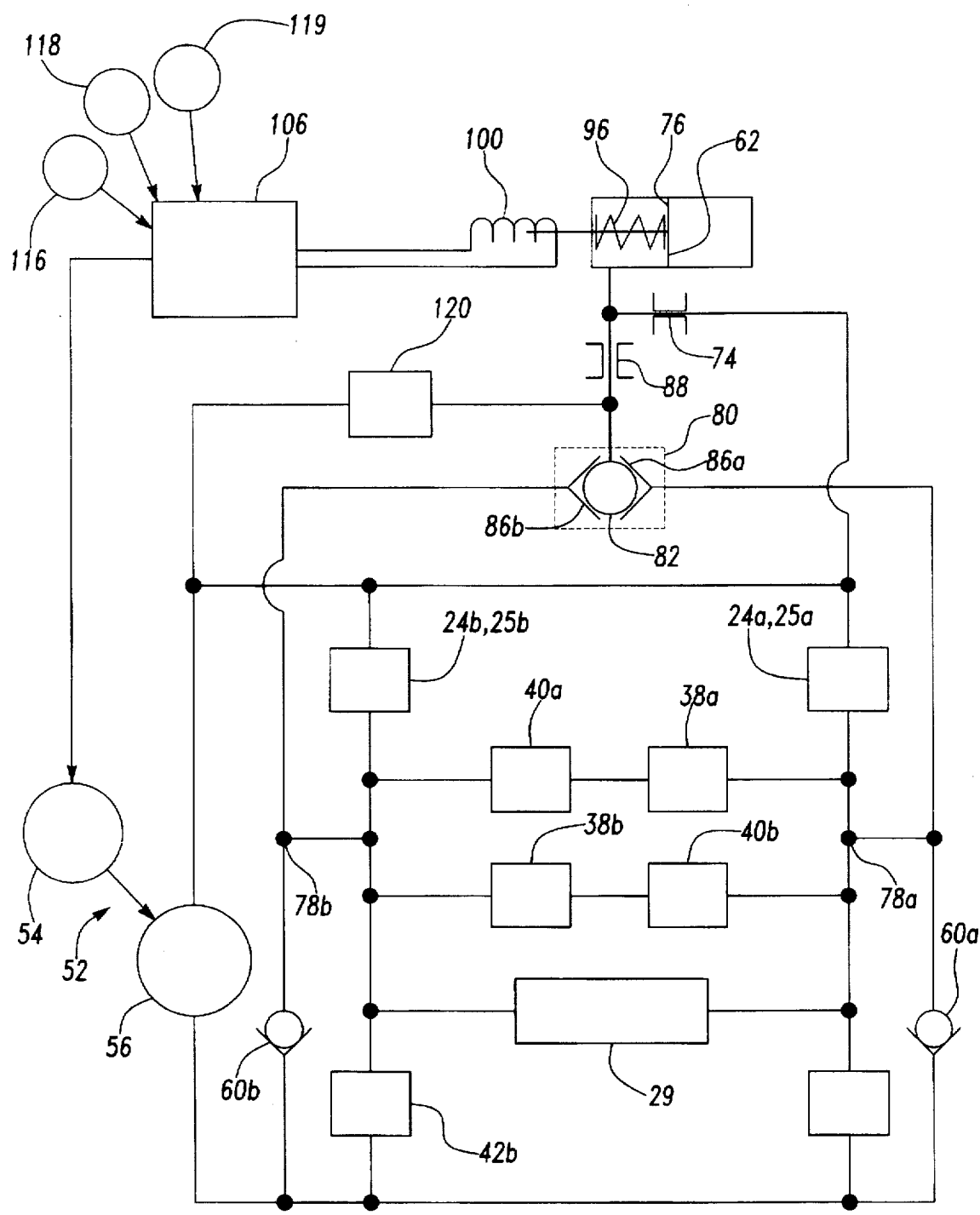
FIG. 2 is a block diagrammatic view illustrating the preferred embodiment of the present invention.
Figure 3:
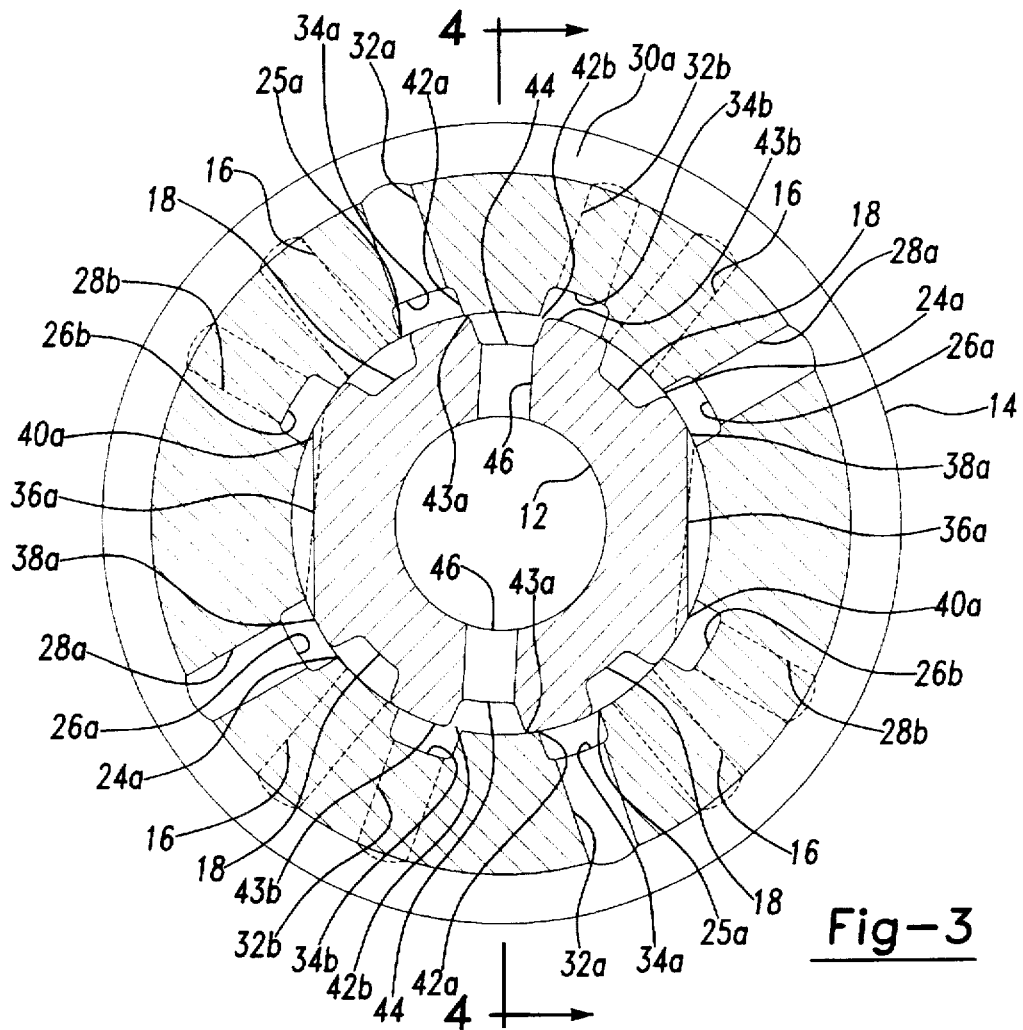
FIG. 3 is a sectional view of the spool shaft and valve sleeve assembly used in the preferred embodiment of the present invention.
Figure 4:
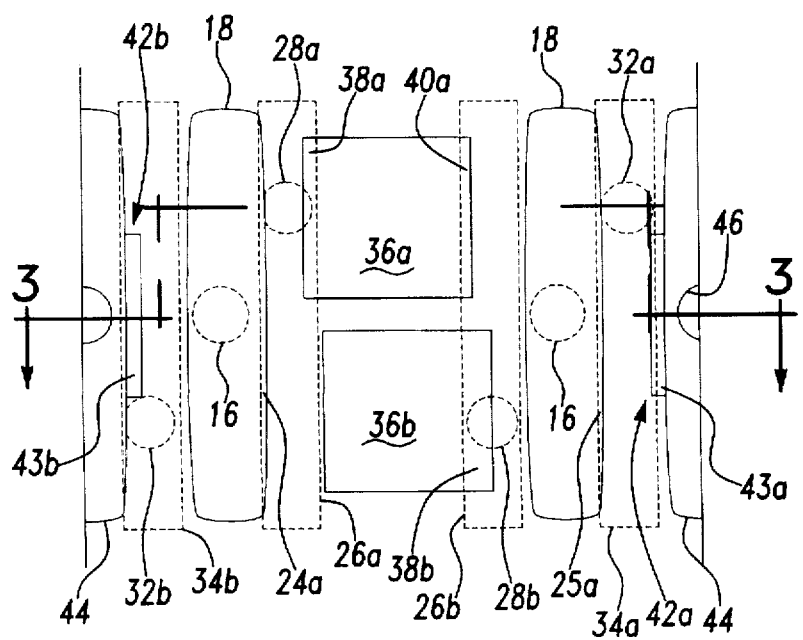
FIG. 4 is a descriptive plan view depicting orifices formed by slots comprised in the spool shaft and valve sleeve assembly used in the preferred embodiment of the present invention.

Shown in FIG. 2 is a diagrammatic view of bootstrap power steering valve 10. Respectively shown in FIGS. 3 and 4 are sectional and descriptive plan views of spool shaft 12 and valve sleeve 14 comprised therein where the spool shaft has been deflected clockwise as would be typical in a right turn. Arrows designated 4 in FIG. 3 depict the viewing direction for FIG. 4 while those labeled 3 in FIG. 4 indicate the split sectional view of FIG. 3.

Pressurized fluid enters input sleeve ports 16 and closed-center input slots 18 via input port 20 shown in FIG. 1A and input groove 22 shown in FIG. 1B. Control pressure forces the fluid through primary flow control orifices 24a into primary right turn slots 26a and through secondary flow control orifices 25a into secondary right turn slots 34a. The portion of the fluid flowing through primary flow control orifices 24a then flows through primary right turn ports 28a and into right turn groove 30a. It then flows through right turn groove 30a and secondary right turn ports 32a to secondary right turn slots 34a. Fluid also flows through right turn parasitic slots 36a via closing and opening right turn parasitic orifices 38a and 40a, respectively, through primary left turn slots 26b, primary left turn ports 28b, left turn groove 30b and secondary left turn ports 32b to secondary left turn slots 34b. Finally, the fluid flows through both right and left pressure control orifices 42a and 42b, respectively, formed particularly by metering ramps 43a and 43b, respectively, to return slots 44 from where it flows through spool ports 46 and on through a known path (not shown) within housing 48 to return port 50 as spent fluid. By symmetry, the fluid flow pattern in a left turn is simply the reverse with the various left turn slots, orifices and groove designated by the letter "b" being substituted for the corresponding right turn slots, orifices and groove designated by the letter "a" and vice versa.

Pressure-effort performance of the bootstrap power steering valve 10 is similar to that of the control valve 411 of incorporated U.S. Pat. No. 5,435,698 as shown in FIGS. 21A through 23 thereof. In particular, bootstrap power steering valve 10 features substantially linear tactile characteristics because of the series arrangement of primary and secondary orifices as is explained in great detail in U.S. Pat. No. 5,435,698. Further, bootstrap power steering valve 10 features enhanced "on-center" tactile characteristics because it features zero "on-center" hydraulic pressure gain. The zero "on-center" hydraulic pressure gain results from the fact that input slots 18 are closed-center. In addition, speed sensitive control of steering assist and/or driver selectable steering effort is implemented via utilizing selected control pressure values as will be explained below.

In operation, pressurized fluid is provided to bootstrap power steering valve 10 by power module 52. Power module 52 comprises servo motor 54 and pump 56 which delivers the pressurized fluid to input groove 22 of valve sleeve 14 via input port 20 of bootstrap power steering valve 10. Spent fluid is returned to the pump 56 after it passes sequentially through the various port, slots, orifices and grooves described above via return port 50.

Spool shaft 12 is rotationally manipulated by a steering wheel (not shown) in order to provide load fluid flow and pressure to a power cylinder 29 (shown in FIG. 2) via right and left turn grooves 30a and 30b and output ports 58a and 58b, respectively. As described in incorporated U.S. Pat. No. 5,435,698 and U.S. patent application Ser. No. 08/322,448, now U.S. Pat. No. 5,505,275, respective check valves 60a and 60b are utilized to preclude cavitation in power cylinder 29 when the steering wheel rapidly returns to center as the vehicle exits a turn.

Kelvin supply pressure is conveyed to high pressure biasing end 62 of pressure control piston 64 via Kelvin supply pressure port 66 from input groove 22. Control fluid flows to passage 68 via passage 70, annular groove 72 and flow limiting orifice 74 from whence it communicates freely with control end 76 of pressure control piston 64. Concomitantly, pressure sensing ports 78a and 78b convey output pressures present in right and left turn grooves 30a and 30b, respectively, to three-way shuttling ball valve 80. In three-way shuttling ball valve 80, as described in incorporated U.S. Pat. No. 5,305,604, ball 82 is loosely captured within cages 84a and 84b between seats 86a and 86b. The higher output pressure value in either of sensing ports 78a or 78b forces ball 82 into the opposing seat 86b or 86a. The control fluid then flows into the respective one of left and right turn grooves 30b or 30a via time constant control orifice 88, annular groove 90, passage 92, cage slots 94 and the annular gap formed between ball 82 and the open one of seats 86b or 86a.

In addition to the pressure value present in the control fluid on control end 76 of pressure control piston 64, compression spring 96 applies force to shoulder 98 of pressure control piston 64 according to the product of its axial displacement and its spring constant. As described in incorporated U.S. patent application Ser. No. 08/322,448, now U.S. Pat. No. 5,505,275, with reference to FIGS. 1 and 2B thereof, flow resistance of the combination of flow limiting and time constant control orifices 74 and 88, respectively, and the compliance of compression spring 96 (e.g., the inverse of its spring constant) times the square of the axially projected area of the pressure control piston 64 determine a quasi "RC" time constant which enables stabilization of a host steering system. Instant axial position of the pressure control piston 64 is determined by balance of the pressure value present in the control fluid on high pressure biasing end 62 of pressure control piston 64 against the sum of the quasi "RC" time constant influenced pressure value present in the control fluid on control end 76 of pressure control piston 64 and the instant value of force provided by compression spring 96 divided by the axially projected area of the pressure control piston 64.

Axial position of the pressure control piston 64 is measured by the instant value of inductance of position transducer 100 comprising fixed coil 102 and moving inductor core 104 affixed to the pressure control piston 64. Modulation-demodulation of the position transducer 100 is effected by electronic control module 106 thus providing an internal voltage representative the instant axial position of the pressure control piston 64. Based upon this and other inputs including temperature, vehicular speed and optional driver selectable control, the electronic control module 106 provides a drive signal for servo motor 54, which in turn, drives pump 56 with a rotational velocity that is a selected function of the instant axial position of the control piston 64. The desired position of pressure control piston 64 is selected by firmware in the electronic control module 106. Generally the rotational velocity is increased with lower values of control pressure whereby the compression spring 96 drives the control piston 64 toward inner end 108 of plug 110.

Should excessive fluid pressure values be demanded such as a consequence of a vehicle operator driving the rack of a host steering gear (not shown) into its travel limit, pilot bypass valve assembly 112 is opened by pressure present in the control fluid on control end 76 of pressure control piston 64. This causes the pressure present in the control fluid on control end 76 of pressure control piston 64 to be reduced because of an increase in pressure loss associated with increased flow through the flow limiting orifice 74. This, in turn, results in the pressure control piston 64 moving away from inner end 108 of plug 110. However, as the pressure control piston 64 moves away from inner end 108 of plug 110, the servo motor 54 is commanded to slow down until the pump 56 provides a reduced flow of pressurized fluid just sufficient to provide for system leakage associated with such elevated pressures. This dramatically reduces the power consumption and system heating that would otherwise be associated with pilot bypass initiated pressure relief in prior art power steering systems.

In the unlikely event of a failure of electronic control module 106 toward the direction of an excessive speed power signal to servo motor 54, the pressure control piston 64 would also move away from inner end 108 of plug 110. This movement of pressure control piston 64 would then be limited to the point where it formed an orifice at the position indicated by reference numeral 114 leading to return port 50.

Enhanced system operation at cold temperatures, as well as speed sensitive control of steering assist driver selectable steering effort, can be implemented with bootstrap power steering valve 10 in a similar manner to that illustrated in FIGS. 15 and 25A–C of incorporated U.S. Pat. No. 5,435,698. In this case temperature transducer 116, vehicular speed transducer 118 and/or driver control 119 issue temperature, velocity and/or driver selected signals, respectively, to electronic control module 106 wherein the above described desired pressure control piston 64 position is chosen by firmware as selected functions of temperature, vehicular speed and if desired, the instant drive signal being provided to the servo motor 54 by the electronic control module 106 itself.

Low speed operation of the above described speed sensitive control of steering assist can be improved in a manner similar to that described with reference to FIGS. 1, 3, 5 and 8 of incorporated U.S. patent application Ser. No. 08/322,448, now U.S. Pat. No. 5,505,275. In this case a two-way solenoid operated valve 120 has a spool member similar to valve spool member 78 discussed in U.S. patent application Ser. No. 08/322,448, now U.S. Pat. No. 5,505,275, slidably disposed within a housing 126. As shown therein, slots are formed in the spool member which are fluidly connected to an internal groove of housing 126 when solenoid 130 is activated. Progressively activating solenoid 130 results in progressively increasing supplemental low speed bypass fluid flow through two-way solenoid operated valve 120 from input port 20 to passage 92. As explained in U.S. patent application Ser. No. 08/322,448, now U.S. Pat. No. 5,505,275, this is done in order to progressively increase hydraulic pressure gain as vehicular speed is reduced, thereby smoothing through "on-center" transitions during parking. In operation, solenoid 130 is progressively activated as vehicular speed is reduced whereby the supplemental low speed bypass fluid flows from passage 92 through cage slots 94, the annular gap formed between ball 82 and the open one of seats 86a or 86b, and the respective ones of sensing ports 78a and 78b, and right and left turn grooves 30a and 30b, thus bypassing the open set of flow control orifices formed by juxtaposed slots in the spool shaft 12 and valve sleeve 14.

Figure 5A:
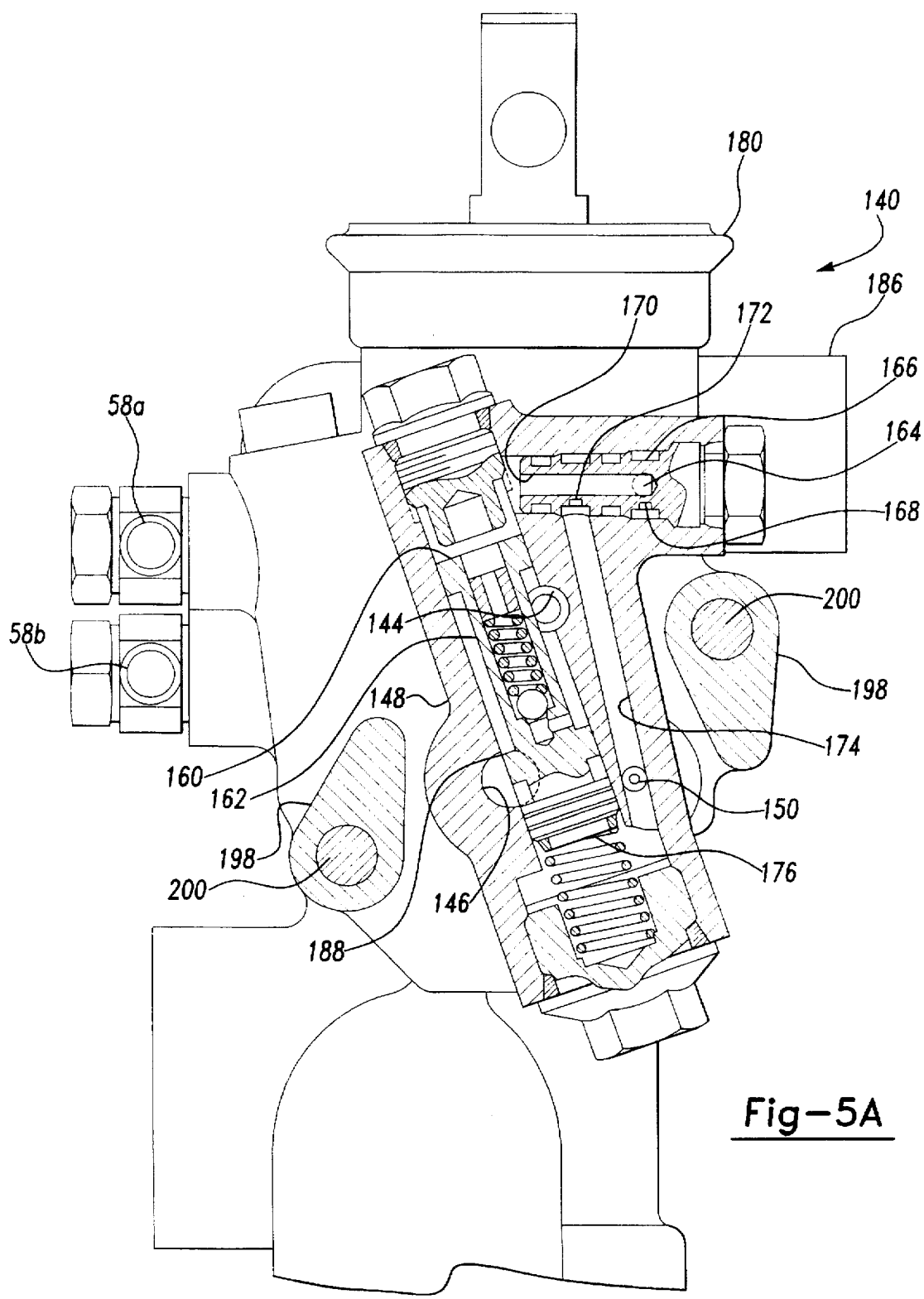
FIG. 5A is a sectional view of the pressure control portion of a control valve used in a first alternative preferred embodiment of the present invention.
Figure 5B:
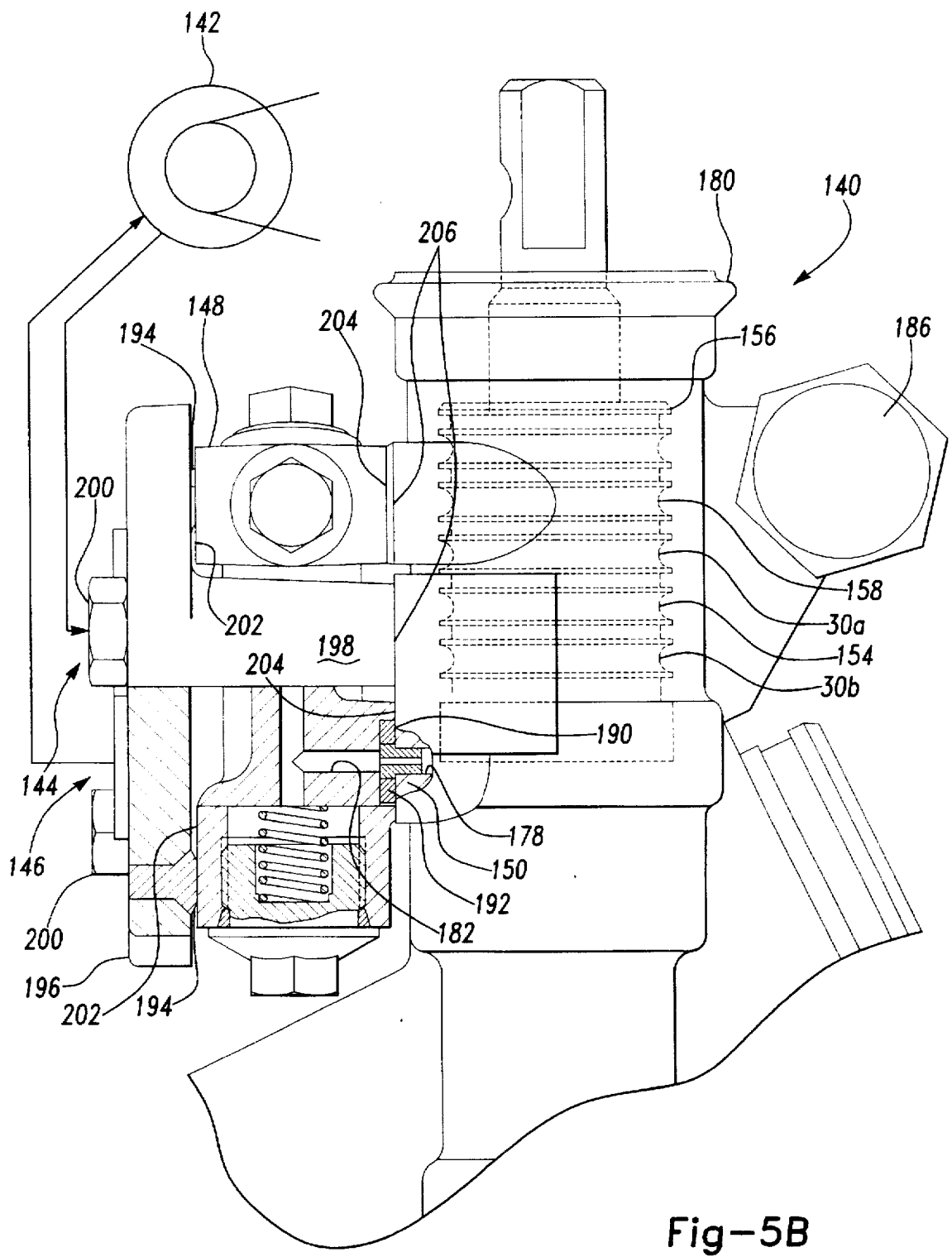
FIG. 5B is a partially sectional view of the pressure control portion of the control valve used in the first alternative preferred embodiment of the present invention.
Figure 5C:
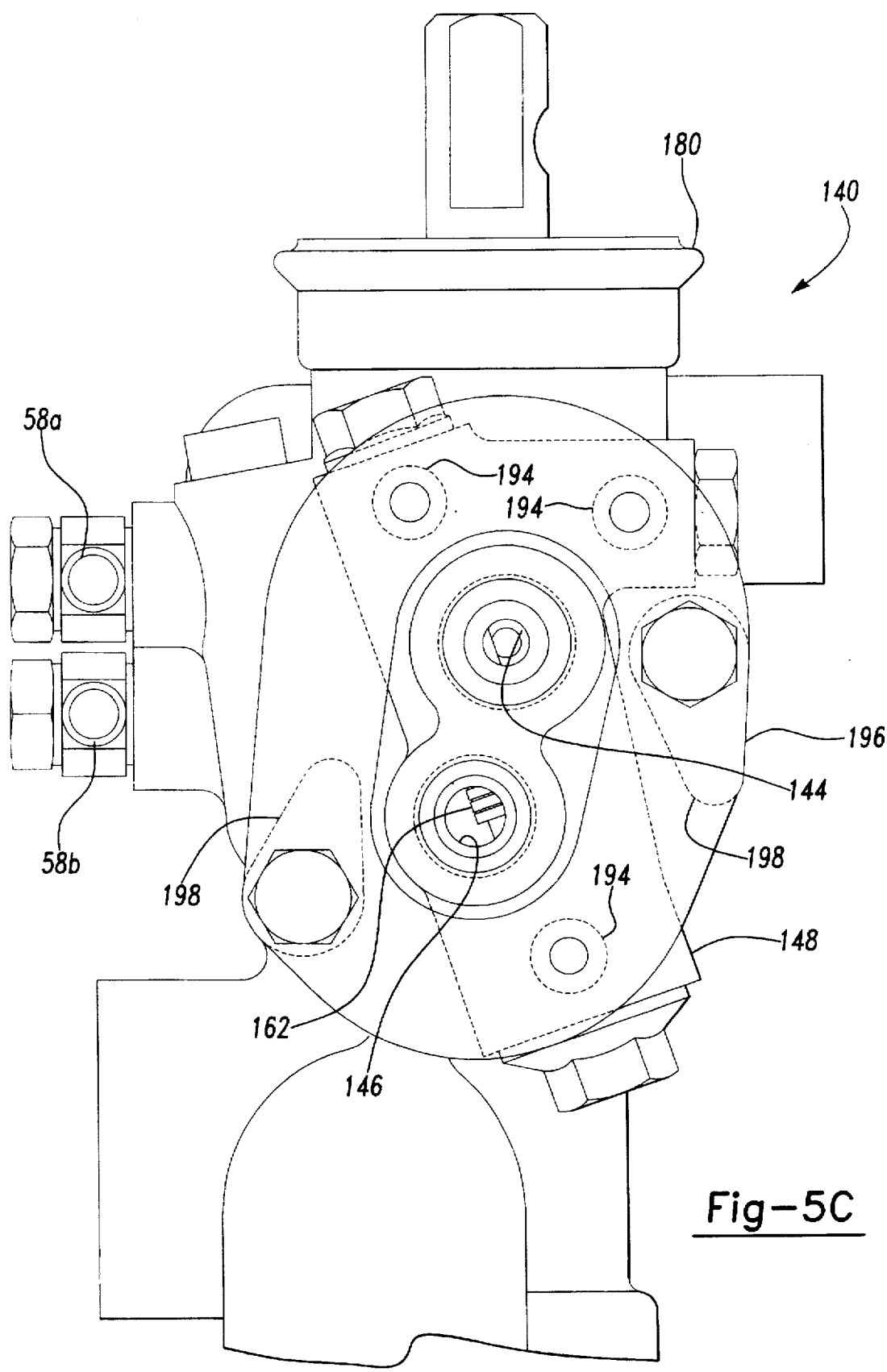
FIG. 5C is a plan view of the pressure control side of the control valve used in the first alternative preferred embodiment of the present invention.
Figure 6A:
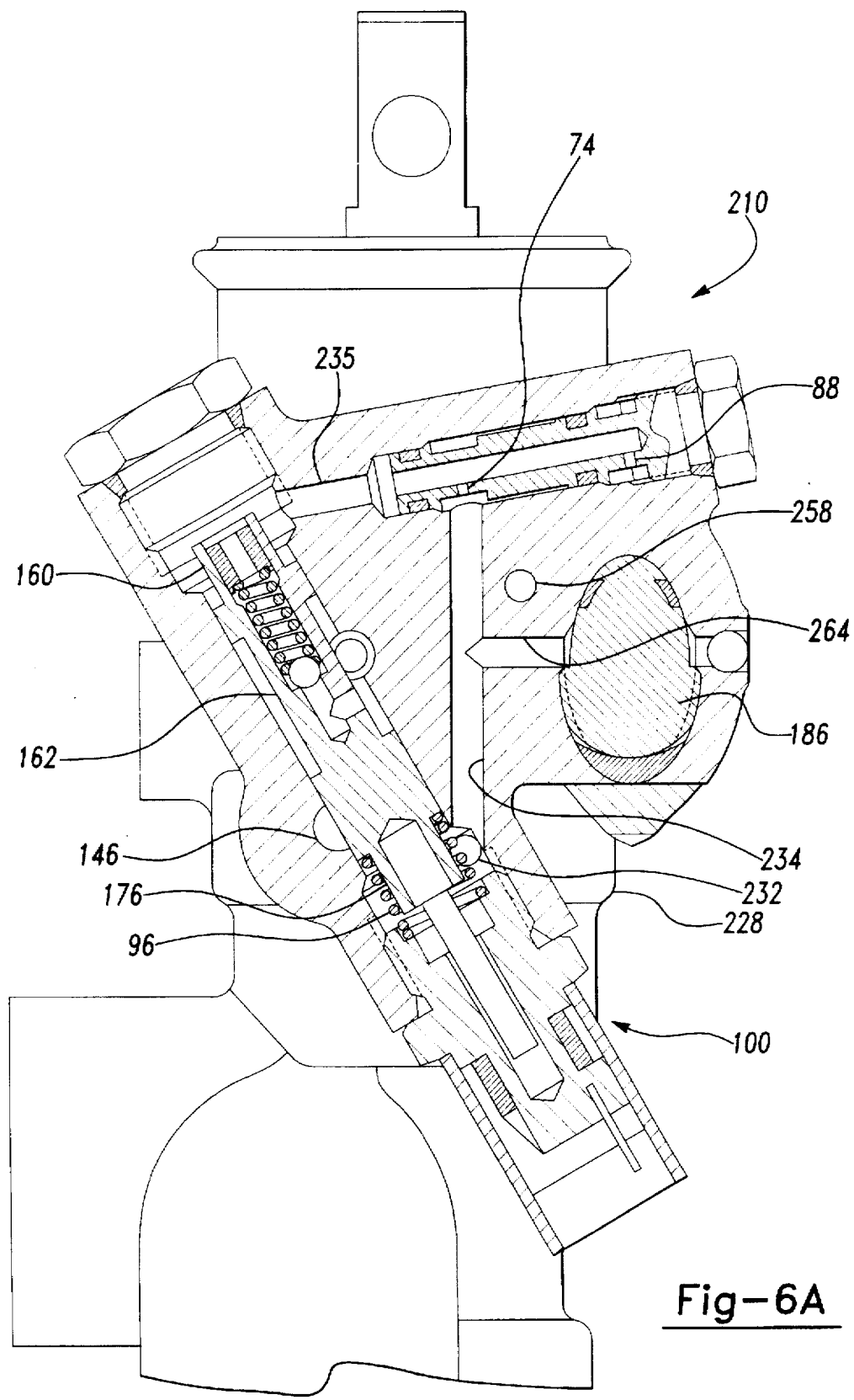
FIG. 6A is a sectional view of a pressure control portion of a control valve used in a second alternative preferred embodiment of the present invention.
Figure 6B:
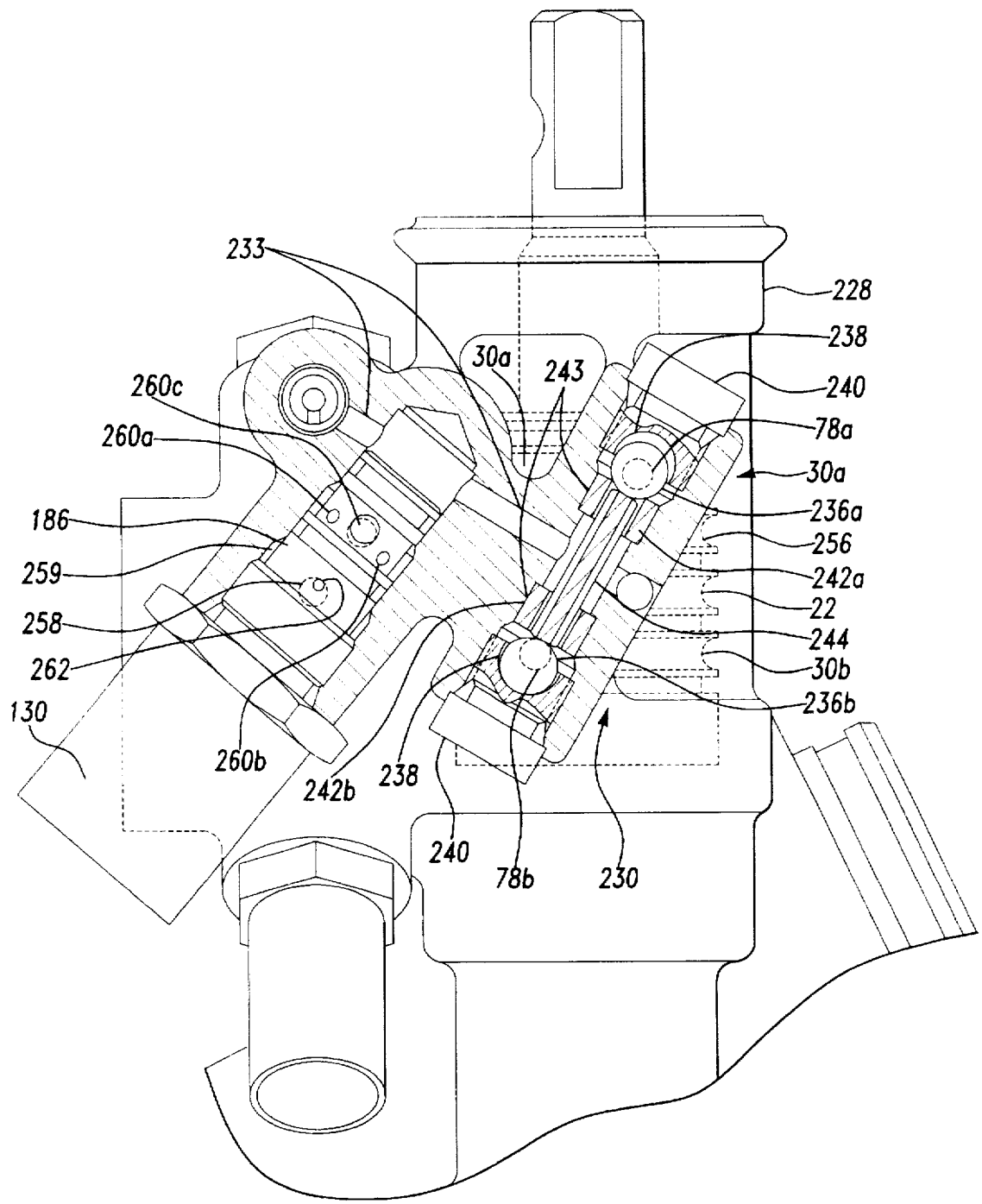
FIG. 6B is a sectional view showing three-way valve and EVO portions of the control valve used in the second alternative preferred embodiment of the present invention.

Shown in FIGS. 5A, 5B and 5C is a bootstrap power steering valve 140 constructed particularly according to the teachings of incorporated U.S. patent application Ser. Nos. 08/119,281, now abandoned, and 08/322,448, now U.S. Pat. No. 5,505,275. Generally, bootstrap power steering valve 140 comprises many of the same features as bootstrap power steering valve 10. As such, like reference numerals are used to identify like features. Specifically, bootstrap power steering valve 10 comprises low side control pressure and is similar to control valve 622 disclosed in FIGS. 38 through 44 of U.S. patent application Ser. No. 08/119,281, now abandoned. This time however, a constant volumetric flow rate of pressurized fluid is provided to bootstrap power steering valve 140 by an engine driven pump 142 in a known manner. Most of the pressurized fluid is bypassed from input port 144 to return port 146 via a supply pressure regulating valve 148 which is configured and operates, with the sole exception of capillary tube 150 described below, in exactly the same manner as supply pressure regulating valve 120 depicted schematically in FIG. 1 of U.S. patent application Ser. No. 08/322,448, now U.S. Pat. No. 5,505,275, and described in detail with reference to FIGS. 2A and 2B thereof.

The portion of the pressurized fluid actually required for operation of bootstrap power steering valve 140 flows from input port 144 to input groove 154 of valve sleeve 156. Spent fluid is returned to the engine driven pump 142 from return port 146 along with the bypassed fluid. Control fluid flows from intermediate return slots (not shown but similar to intermediate return slots 664a and 664b shown in FIGS. 38C and 39 of U.S. patent application Ser. No. 08/119,281, now abandoned) and intermediate return groove 158 formed in valve sleeve 156. The control fluid is then conveyed to control end 160 of pressure control piston 162 via intermediate return port 164, annular groove 166, time constant orifice 168 and passage 170. The control fluid then flows from passage 170 through flow limiting orifice 172 and passage 174 to low pressure biasing end 176 of the pressure control piston 162. Finally, the control fluid flows into supplemental valve housing port 178 of valve housing 180 via passage 182 and capillary tube 150. Low temperature enhancement is obtained via an increase in biasing pressure impressed upon low pressure biasing end 176 of the pressure control piston 162 when fluid viscosity increases to the point where pressure drop through the capillary tube 150 becomes comparable to that associated with the flow limiting orifice 172.

Speed sensitive control of steering assist can be implemented with bootstrap power steering valve 140 in a similar manner to that illustrated in FIGS. 1, 2A, 3, 4, 5, 6 and 8 of incorporated U.S. patent application Ser. No. 08/322,448, now U.S. Pat. No. 5,505,275. Solenoid operated three-way valve 186 is identical to three-way valve 70 shown particularly in FIGS. 3 and 4 of U.S. patent application Ser. No. 08/322,448, now U.S. Pat. No. 5,505,275, and operates in precisely the same manner with respect to bootstrap power steering valve 140 as three-way valve 70 does with respect to valve assembly 16 of U.S. patent application Ser. No. 08/322,448, now U.S. Pat. No. 5,505,275.

Although supply pressure regulating valve 148 operates in the same manner as supply pressure regulating valve 120 of U.S. patent application Ser. No. 08/322,448, now U.S. Pat. No. 5,505,275, as mentioned above, valve assembly 16 of U.S. patent application Ser. No. 08/322,448, now U.S. Pat. No. 5,505,275 is normally operated with its metering orifice 139 in a closed condition. Metering orifice 188 of the present invention, however, is normally open and actively bypassing pressurized fluid as is described above. Because of this an objectionable hissing sound is generated therein and is conducted throughout supply pressure regulating valve 148. Further, the hissing sound would be conducted to and through any structure rigidly affixed thereto. For that reason it is necessary to isolate supply pressure regulating valve 148 with respect to valve housing 180 by a compliantly mounting arrangement. Supply pressure regulating valve 148 is compliantly mounted with respect to valve housing 180 with elastomeric seal and pad members as follows:

"O-ring" seal members 190 are located in counter bores 192 formed supply pressure regulating valve 148 in each of input port 144, return port 146, intermediate return port 164 and passage 182. Elastomeric pad members 194 are affixed to bracket 196 which comprises oblong mounting legs 198. Oblong mounting legs 198 are of selected length such that when bracket 196 is fixedly mounted onto valve housing 180 such as by bolts 200, the elastomeric pad members 194 provide adequate compressive force to land surfaces 202 of bracket 196 to compress the "O-ring" seal members 190 to the point where they seal their respective ports but do not allow rim surfaces 204 of bracket 196 to contact mounting surface 206 of valve housing 180. In so doing a maximum gap of about 0.004 in. is left between the rim surfaces 204 and contact mounting surface 206. This is necessary in order to prevent the particular "O-ring" seal member 190 in the counter bore 192 associated with input port 144 from "blowing out" whenever it is subject to maximum bypass pressure.

Figure 7A:
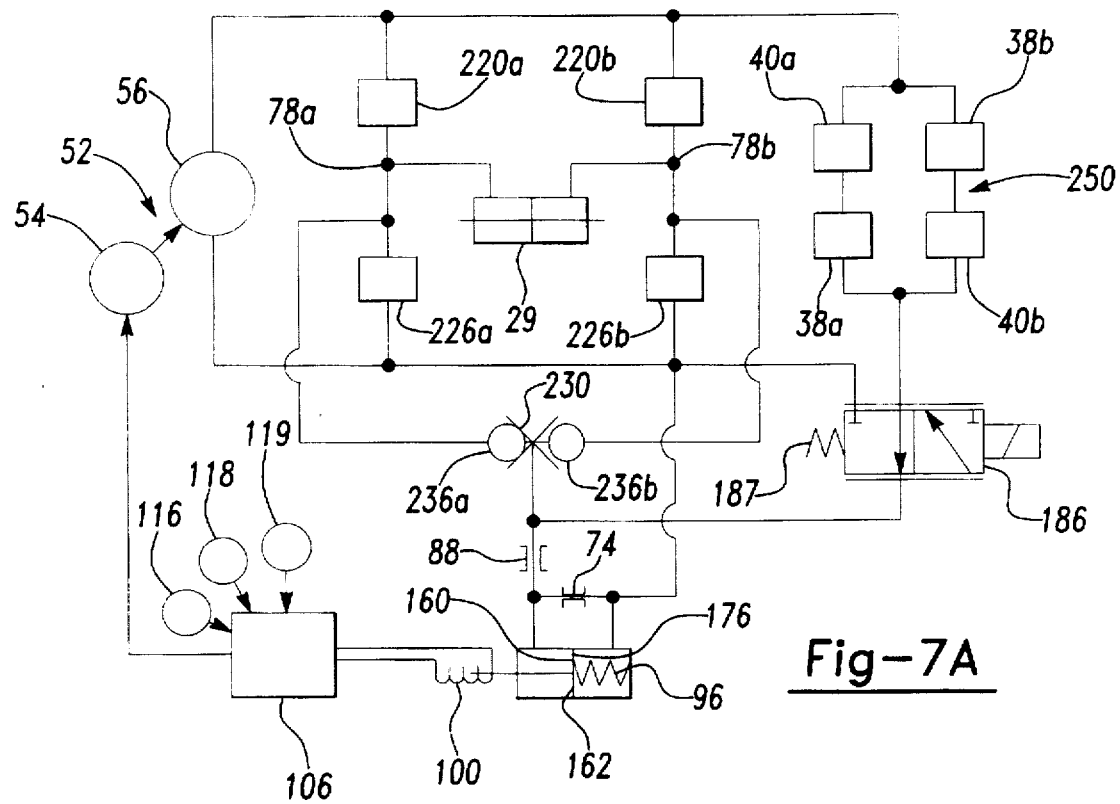
FIGS. 7A and 7B are block diagrammatic views illustrating speed sensitive and non-speed sensitive versions of the second alternative preferred embodiment of the present invention.
Figure 7B:
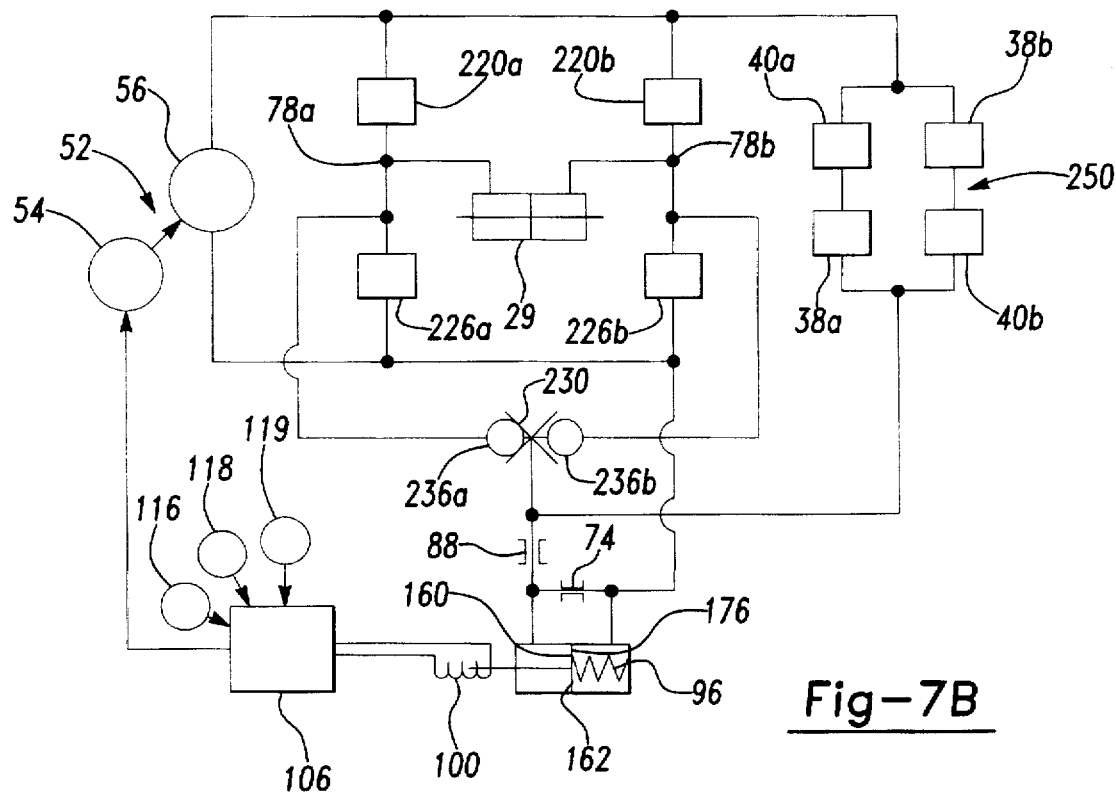
Figure 8A:
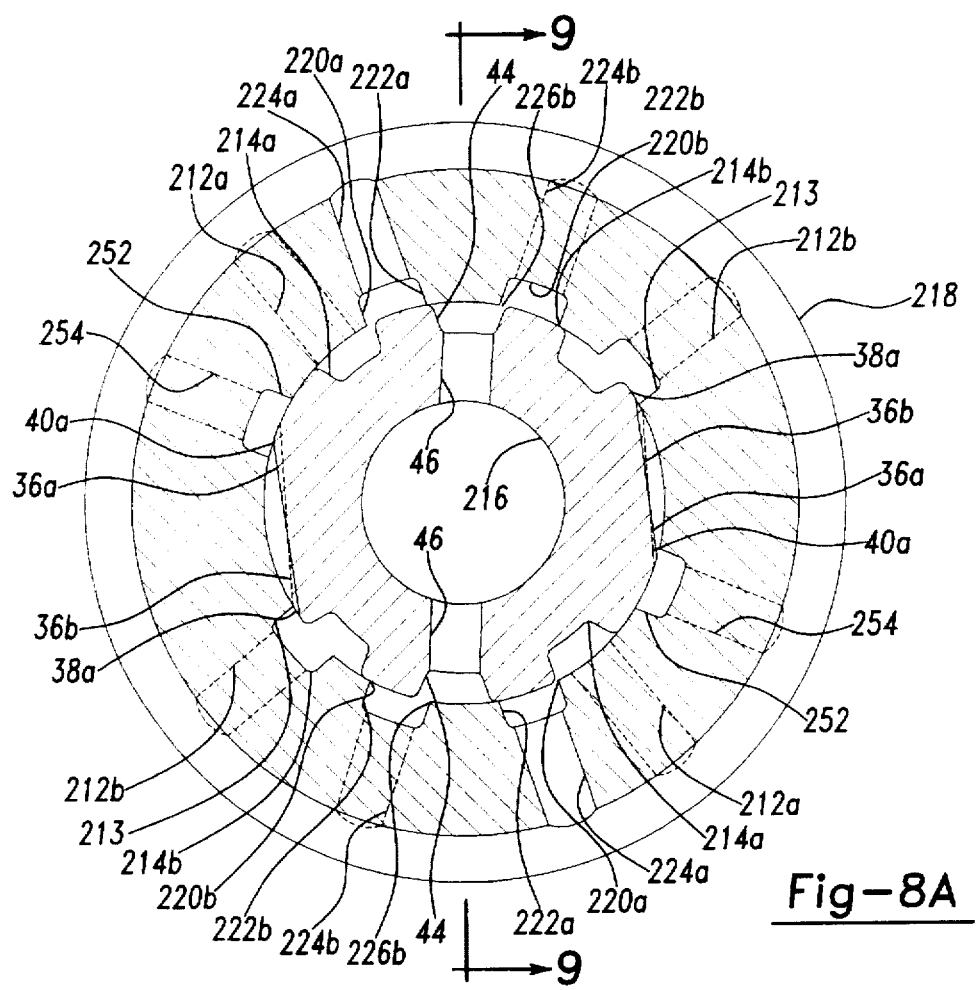
FIG. 8A is a sectional view of the spool shaft and valve sleeve assembly used in the second alternative preferred embodiment of the present invention.
Figure 9:
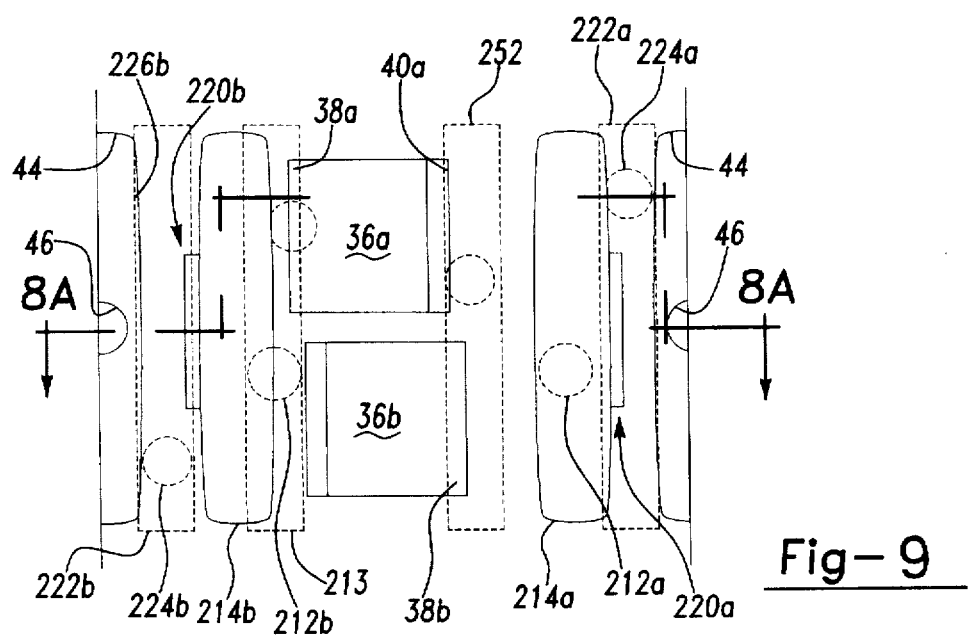
FIG. 9 is a descriptive plan view depicting orifices formed by slots comprised in the spool shaft and valve sleeve assembly used in the second alternative preferred embodiment of the present invention.

Shown in FIGS. 6A, 6B, 7A, 7B, 8A, 8B, 8C, 9, 10A and 10B is a bootstrap power steering valve 210 constructed similarly to bootstrap power steering valves 10 and 140 depicted in FIGS. 1A, 1B, 1C, 2, 3, 4, 5A, 5B and 5C. Bootstrap power steering valve 210 comprises many of the same features used in bootstrap power steering valves 10 and 140. It is controlled in a similar manner via variably determined low side control pressure. As such, like reference numerals are used to identify like features. Shown in FIGS. 7A and 7B are diagrammatic views of alternate preferred embodiments for bootstrap power steering valve 210 which depict speed sensitive and non-speed sensitive versions thereof. Respectively shown in FIGS. 8A and 9 are sectional and descriptive plan views of spool shaft 216 and valve sleeve 218 comprised therein where the spool shaft has been deflected clockwise as would be typical in a right turn. Arrows designated 9 in FIG. 8A depict the viewing direction for FIG. 9 while those labeled 8A in FIG. 9 indicate the sectional view of FIG. 8A.

In the low speed mode, pressurized fluid enters bootstrap power steering valve 210 via input groove 22, input sleeve ports 212a and 212b to input slots 214a, and 213 and 214b, respectively, as shown particularly in FIG. 8A wherein spool shaft 216 has been deflected clockwise with reference to valve sleeve 218 as would be typical in a right turn. The portion of the fluid flowing through power cylinder 29 flows through opening right pressure control orifices 220a to right turn slots 222a, right turn ports 224a and into right turn groove 30a. Concomitantly, fluid returning from power cylinder 29 flows in through left turn groove 30b and left turn ports 224b to left turn slots 222b. The portion of the fluid flowing directly to left turn slots 222b flows through closing left pressure control orifices 220b. Control pressure forces the fluid through left flow control orifices 226b into return slots 44 and spool ports 46. As with bootstrap power steering valve 10, spent fluid flows through a known path (not shown) within housing 228 to return port 146 and returns to a reservoir (also not shown). No cavitation prevention means such as check valves 60a and 60b are required because the minimum pressure present on either side of power cylinder 29 is the control pressure. And by symmetry, the fluid flow pattern in a low speed left turn is simply the reverse with the various left turn slots, orifices and groove designated by the letter "b" being substituted for the corresponding right turn slots, orifices and groove designated by the letter "a" and vice versa.

Control pressure is determined by control fluid flowing from the lower pressure one of right or left turn grooves 30a or 30b through the respective one of sensing ports 78a or 78b, a three-way shuttling ball valve 230, time constant control orifice 88 and flow limiting orifice 74 to a Kelvin return port 232 via passages 233 and 234. The control pressure is applied across pressure control piston 162 against a biasing force provided by compression spring 96. Pressure values present in the control fluid flowing between time constant control orifice 88 and flow limiting orifice 74 are conveyed to control end 160 of pressure control piston 162 via passage 235 while low pressure biasing end 176 of pressure control piston 162 is fluidly coupled to Kelvin return port 232. As before, instant values of control pressure are measured by position transducer 100 whereby electronic control module 106 suitably drives servo motor 54.

In this case, however, three-way shuttling ball valve 230 differs significantly from the prior art. In three-way shuttling ball valve 230, right and left balls 236a and 236b are loosely captured between concave surfaces 238 of plugs 240, and right and left seats 242a and 242b in a manner similar to either of check valves 60a and 60b used in bootstrap power steering valve 10. In addition, pin 244 is captured between right and left balls 236a and 236b, and within right and left seats 242a and 242b. The configuration of pin 244, right and left balls 236a and 236b, and right and left seats 242a and 242b is chosen dimensionally such that only one of right and left balls 236a and 236b can form a seal with right and left seats 242a and 242b at a time. Thus, the higher output pressure value in either of right or left turn grooves 30a or 30b forces the respective right or left ball 236a or 236b into its respective right or left seat 242a or 242b. Fluid is then able to flow through the open orifice formed between the other ones of left or right balls 236b or 236a and left or right seats 242b or 242a as low side control pressure fluid.

As shown particularly in FIGS. 10A and 10B, pin 244 is formed in a cylindrical manner with a star configuration extending between parallel planes 245. Thus, outer surfaces 246 of arms 248 serve to nominally center pin 244 within bores 243 of right and left seats 242a and 242b and still allow for the free passage of fluid through either of bores 243 in the axial spaces formed between arms 248.

During high speed operation, additional fluid flows through bypass high speed circuit 250 from input slot 213 through left and/or right turn parasitic slots 36a and/or 36b to high speed slots 252 as shown in FIGS. 7A, 8A and 9. The additional fluid flows through left and/or right turn parasitic slots 36a and/or 36b via closing and opening parasitic orifices 38a and 40a, and/or 38b and 40b, respectively, as described above with reference to bootstrap power steering valve 10. From there it flows through high speed ports 254 and high speed groove 256 to solenoid operated three-way valve 186 via passage 258 and annular chamber 259. As explained above with reference to bootstrap power steering valve 140, solenoid operated three-way valve 186 is identical to three-way valve 70 shown particularly in FIGS. 3 and 4 of U.S. patent application Ser. No. 08/322,448, now U.S. Pat. No. 5,505,275, and operates in precisely the same manner with respect to bootstrap power steering valve 210 as three-way valve 70 does with respect to valve assembly 16 of U.S. patent application Ser. No. 08/322,448, now U.S. Pat. No. 5,505,275.

As depicted in FIG. 7A, solenoid operated three-way valve 186 is positioned in its high speed mode which is enabled by an internal bias compression spring 187 whenever solenoid 130 is deactivated. The fluid flows through high speed controlled orifices 260a, 260b and 260c in solenoid operated three-way valve 186 and on through passage 233 and the open annular space formed between the left or right balls 236b or 236a and left or right seats 242b or 242a to the lower pressure one of sensing ports 78b or 78a and the respective one of left and right turn grooves 30b or 30a. As illustrated in FIG. 8A, the left turn side is the lower pressure side. Thus, the additional fluid flows through the left turn ports 224b to the left turn slots 222b from which the control pressure forces it to flow through the left flow control orifices 226b into return slots 44 and spool ports 46 along with the other fluid flowing therethrough as explained above with reference to low speed operation.

Whenever solenoid 130 is activated (i.e., as in the low speed mode), solenoid operated three-way valve 186 enables supplemental low speed bypass fluid flow in parallel with the right and left flow control orifices 226a and 226b. In this case, the supplemental low speed bypass fluid flows along a reverse path from the lower pressure one of left or right turn grooves 30b or 30a through the respective one of sensing ports 78b or 78a, three-way check valve 230, passage 233, low speed controlled orifice and port 262 of solenoid operated three-way valve 186, and passage 264 to passage 234 and Kelvin return port 232. Directing the supplemental low speed bypass fluid flow in this manner results in some low temperature control pressure enhancement. This is because the supplemental low speed bypass fluid flow is directed through the Kelvin return port 232 whereby pressure on low pressure biasing end 176 of pressure control piston 162 is increased.

Although bootstrap power steering valve 210 has been described as operating in a speed sensitive manner, it is obvious that it could be made non-speed sensitive (and therefore operationally equivalent to bootstrap power steering valve 10) by eliminating the solenoid operated three-way valve 186 in the manner shown in FIG. 7B. This might be an attractive thing to do because both speed sensitive and non-speed sensitive control valves would comprise precisely the same spool shafts 216 and valve sleeves 218. The resulting uniformity in manufacturing might very well compensate for the added material and machining costs associated with adding high speed groove 256 to the valve sleeve 218.

Figure 8B:
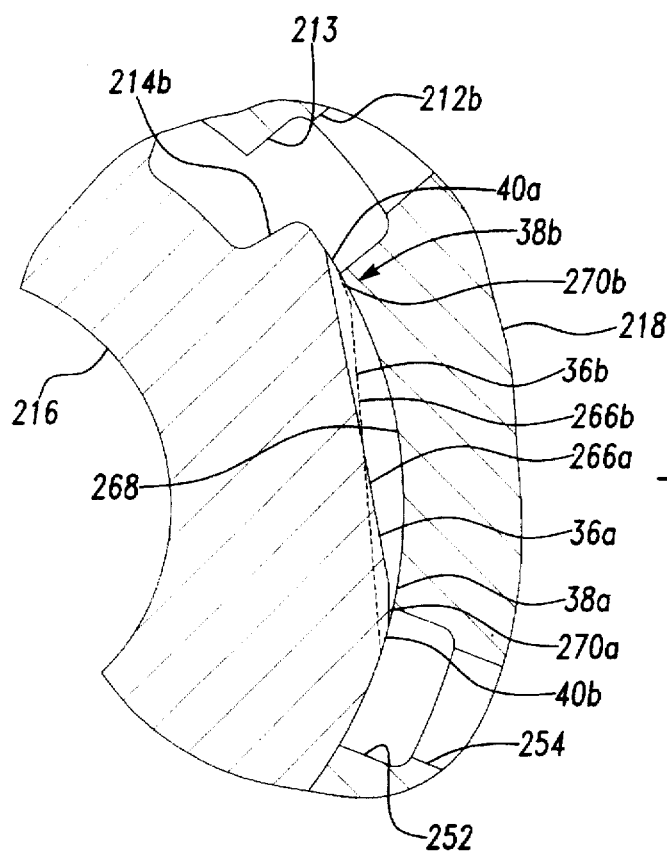
FIGS. 8B and 8C are enlarged sectional views of alternate high speed slots formed in the spool shaft depicted in FIG. 8A.
Figure 8C:
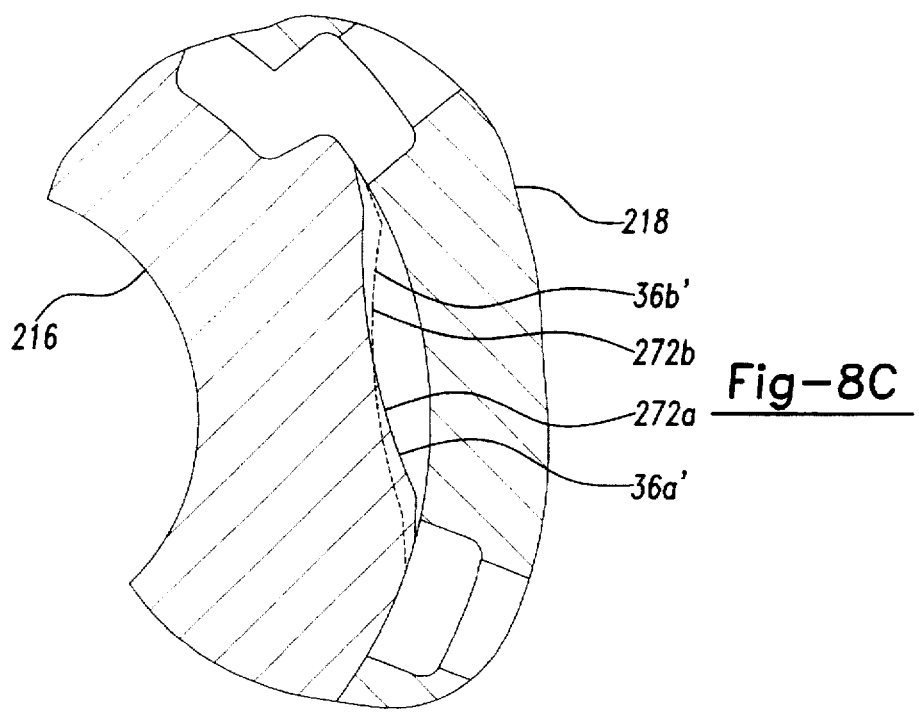

With particular reference now to FIGS. 8B and 8C, alternate preferred embodiments of the right and left turn parasitic slots 36a and/or 36b are thereshown. In FIG. 8B, right and left turn parasitic slots 36a and/or 36b are depicted with long planer surfaces 266a and 266b which respectively define closing parasitic orifices 38a and 38b. Closing parasitic orifices 38a and 38b have a closure angle with reference to bore 268 of valve sleeve 218 of approximately 23°. Opening parasitic orifices 40a and 40b, on the other hand, are respectively defined by short planer surfaces 270a and 270b. Opening parasitic orifices 40a and 40b have a closure angle with reference to bore 268 of valve sleeve 218 of approximately 8°. Forming the opening parasitic orifices with a significantly smaller closure angle than the closing parasitic orifices results in a longer linear range in resulting pressure-effort curves as will be presented below in FIGS. 11B and 13B. In FIG. 8C, right and left turn parasitic slots 36a' and 36b' additionally comprise concave cylindrical depressions 272a and 272b in order to further reduce viscous losses at very low temperatures.

Figure 11A:
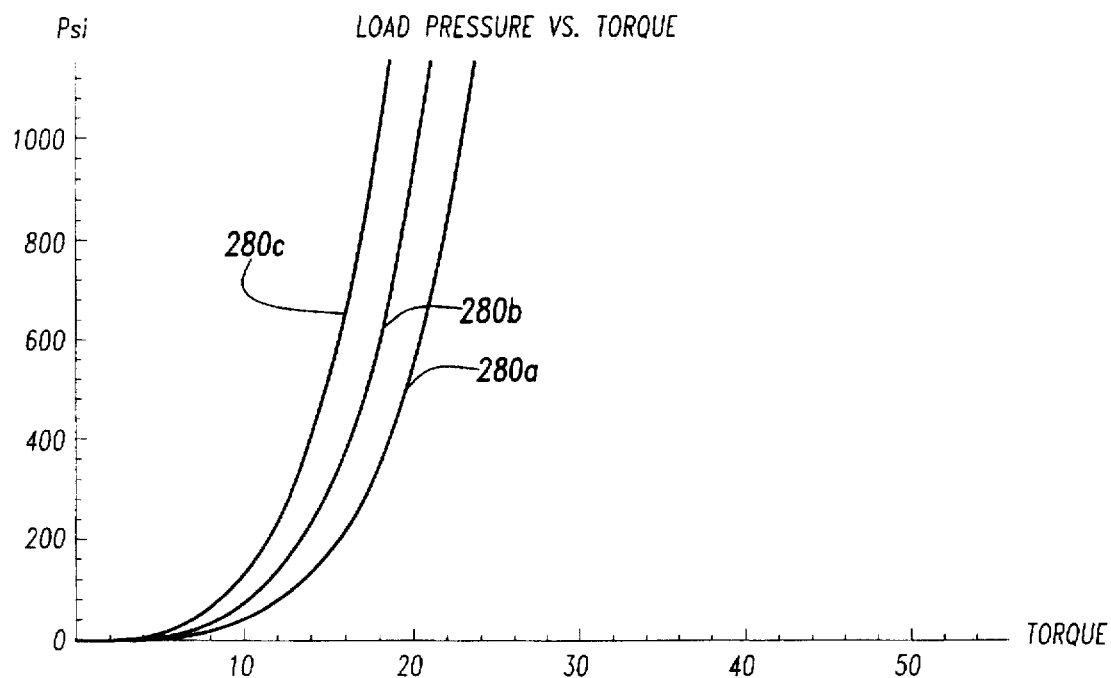
FIGS. 11A and 11B are graphical depictions of static low and high speed pressure-effort characteristics of control valves used in the second alternative preferred embodiment of the present invention.
Figure 11B:
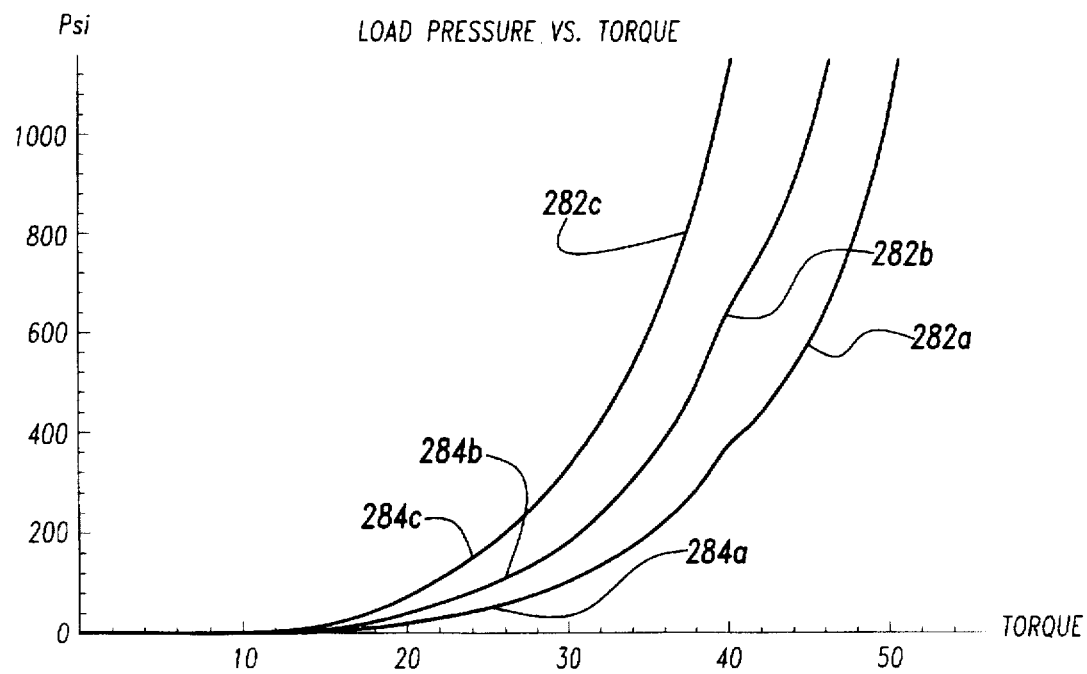

Shown in FIG. 11A is a graphical depiction of low speed pressure-effort characteristics for a preferred embodiment of the bootstrap control valve 210 wherein static low speed curves 280a, 280b and 280c were obtained with three respective control pressure values 20 psi, 35 psi and 60 psi. Similarly shown in FIG. 11B is a graphical depiction of the high speed pressure-effort characteristics for the same bootstrap control valve 210 wherein static high speed curves 282a, 282b and 282c were also obtained with the same three respective control pressure values 20 psi, 35 psi and 60 psi. (High speed curves 282a, 282b and 282c could also represent the pressure-effort characteristics for bootstrap control valve 10 with the same three control pressure values as well.) In each case, pressure values depicted in the curves at the same torque values are proportional to their respective control pressure values. And, high speed curves 282a, 282b and 282c comprise extended ranges of quasi-linear behavior over respective curve segments 284a, 284b and 284c. In addition, the control versatility effected by utilizing firmware customized variable control pressures enables customization of the pressure-effort curves as follows:

Presented in FIG. 12 is a flow chart depicting a method of firmware customization of the pressure-effort curves of either of control valves 10 or 210. The essence of this method is to vary control pressure as a function of the rotational speed of and/or current applied to servo motor 54. The method comprises the steps of measuring the flow rate of pressurized fluid flowing through either of control valves 10 or 210 via measuring rotational speed of and/or current applied to servo motor 54 and varying command values for the control pressure via firmware selection within electronic control module 106 as a selected function of instant values of the rotational speed of and/or current applied to servo motor 54. In general, the firmware selection of command values for the control pressure may also be dependent upon other inputs such as temperature, vehicle speed and driver selection as is explained above. Because of this, the firmware selection of command values for the control pressure is normally taken from a multi-dimensional map of such values which is referenced to all of the inputs.

Measurement of the rotational speed of and current applied to servo motor 54 is routinely accomplished within electronic control module 106 in providing power signals to servo motor 54 in order to effect stable servo control thereof. For instance, if servo motor 54 is of either a brushless DC or switched reluctance type, it is necessary to measure rotor position in order to effect commutation. Typically, necessary tachometer information is derived by determining the rate of change of the rotor position.

Figure 13A:
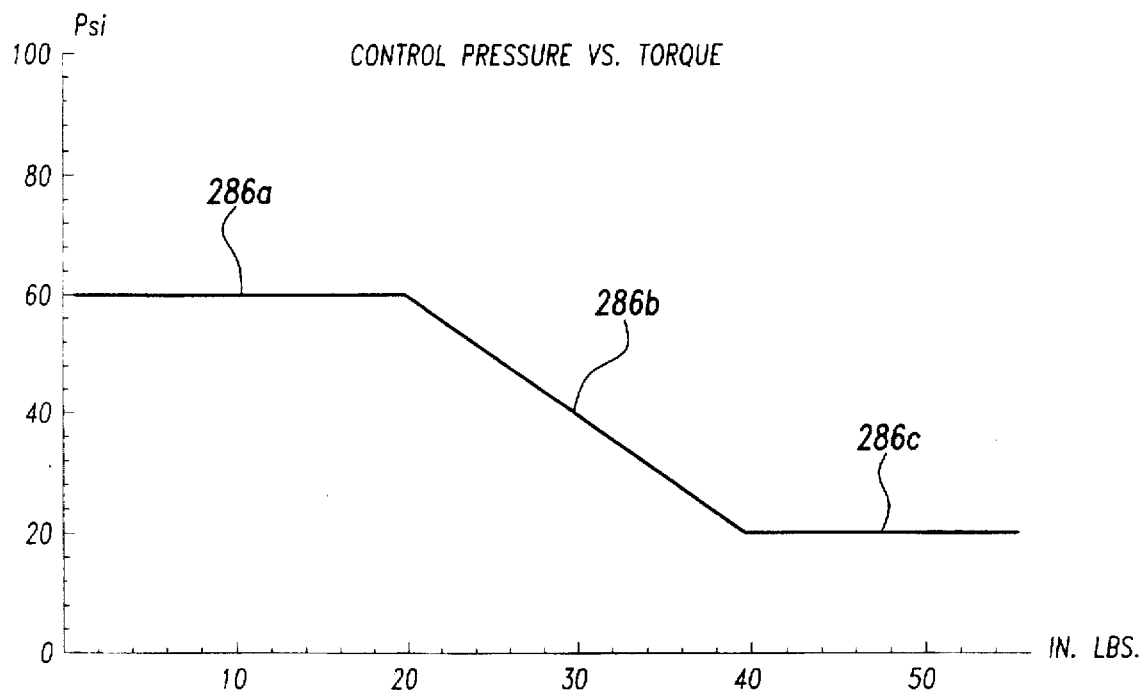
FIGS. 13A and 13B are graphical depictions of control pressure and high speed pressure-effort characteristics achieved in utilizing the method depicted in FIG. 12.
Figure 13B:
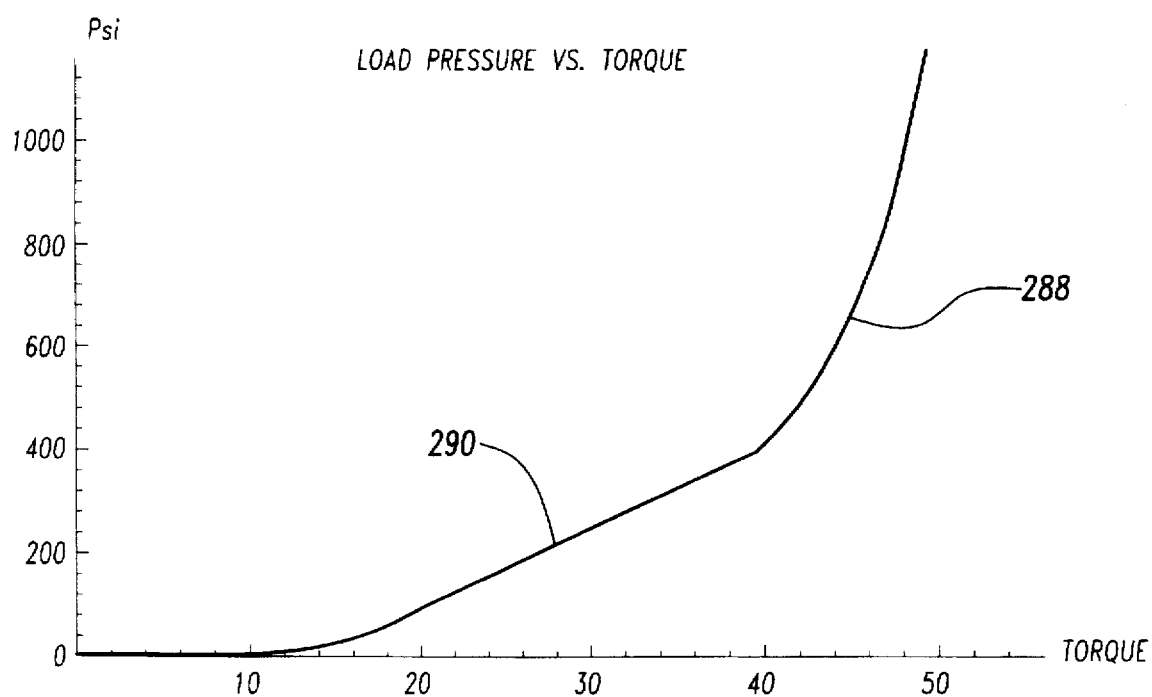

Referring now to FIGS. 13A and 13B, thereshown is an example of the method of firmware customization of the pressure-effort curves. FIG. 13A depicts a simple three line segment set of command values for the control pressure as a function of applied control valve torque at high speed. Control pressure varies from 20 psi to 60 psi values as shown by line segments 286a, 286b and 286c. (Plotting the command values for the control pressure as a function of applied control valve torque is allowed because of a known relationship linking servo motor speed, control pressure and applied torque.) FIG. 13B depicts the resulting static high speed curve 288. Linear region 290 of static high speed curve 288 illustrates significant improvement in quality and range of linearity when compared to the curve segments 284a, 284b and 284c of FIG. 11B.

While the present invention has been described in connection with the preferred embodiments of the various figures, it is also understood that other similar embodiments may be used or modifications or additions may be made to the described embodiments for performing the same function of the present invention without deviating therefrom. Specifically, the above embodiments comprise examples of the utilization of both high and low side derived control pressure. Control valves comprising both an open-center orifice bridge and separate flow control orifices, and an orifice bridge comprising one set of nominally closed-center flow control orifices and another set of open-center pressure control orifices are disclosed. Further, both hydro-mechanical and electro-hydro-mechanical system operation are described. Alternate series opening and closing secondary pressure control orifice topologies for achieving linearized high speed operation are disclosed. Two types of very low temperature enhancement and two types of speed sensitive control of steering assist are disclosed.

There are various reasons for preferentially choosing between these embodiments. Of course, economic reasons are prevalent in making such choices. On the other hand, two conflicting performance characteristics are factors in selecting between high or low side derived control pressure. On one hand, high side derived control pressure results in purging the various associated passages and cavities of air over a few pressure cycles while similar purging in control valves using low side derived control pressure may take significantly longer. However, on the other hand, using low side derived control pressure results in minimum pressure in power cylinder 29 being at least at the instant control pressure value. This has a somewhat beneficial effect in suppressing a condition known as "rattle". Rattle is believed to be caused hydraulically when the dirigible wheels are subject to very short duration lateral impacts. This occurs when entrained air comes out of solution in the low pressure side of power cylinder 29. An "impact" noise then occurs when the resulting vapor bubbles collapse. So increasing the minimum pressures helps to alleviate this condition.

In any case, because various combinations of these six system variations could be configured to the extent of 64 possible preferred embodiments, it is obvious that the scope of the present invention is not limited to the particular combinations of features comprised in the above mentioned preferred, and first and second alternative preferred embodiments. Therefore, the present invention should not be limited to either of these embodiments but, rather, construed in breadth and scope in accordance with the recitation of the appended claims.

I claim:

1. An apparatus for controlling pressurized fluid flow through a power steering system for a motor vehicle of the type having a power cylinder, a piston mounted in the power cylinder and dividing the power cylinder into first and second chambers, said system having a pressurized fluid source having an input and an output, said apparatus comprising:

a rotary valve assembly comprising:

a housing;

a rotary input member mounted to said housing;

a pair of input flow control valves, each of said pair of input valves having an inlet and an outlet, each inlet of said pair of input valves being fluidly connected to said output of said pressurized fluid source, one outlet of said pair of flow control valves fluidly connected to the first chamber of the power cylinder of another of said pair of flow control valves fluidly connected to the second chamber of the power cylinder;

a pair of parasitic valves, each having an orifice fluidly connected to one of said pair of outlets of said flow control valves and permitting fluid flow between said pair of outlets when said rotary valve is in a center position;

a pair of pressure control valves, each of said pair of pressure control valves having an inlet and an outlet, each inlet of said pair of pressure control valves being fluidly connected to respective outlets of said pair of flow control valves, said outlets of said pressure control valve being fluidly connected to said inlet of said pressurized fluid source, wherein one of said flow control valves variably opens, said other of said output pressure control valves variably closes and said pair of parasitic valves close progressively with torque applied to said rotary input member to create a differential pressure between said first and second chambers of said power cylinder;

means for measuring a differential pressure between a pair of control pressure input ports and for providing a signal representative of the instant differential pressure value between said pair of input ports;

means for fluidly coupling one port of said pair of input ports of said measuring means to one of said outlets of said pair of flow control valves having the highest instant pressure value;

means for fluidly coupling an other port of said pair of input ports of said measuring means to said outlet of said pressurized fluid source; and means for selectively driving said source of pressurized fluid in response to said signal.

2. The apparatus of claim 1, wherein said rotary input member comprises a pair of primary input grooves and a supplemental input groove, said supplemental input groove being fluidly connected to said pair of input ports of said measuring means, said pair of primary input grooves being connected to said pair of flow control valves.

3. The apparatus of claim 1, wherein said pair of input ports of said differential pressure measuring means comprise a pair of control pressure ports in fluid communication with respective ones of said pair of flow control valves.

4. The apparatus of claim 3 comprising a pressure control piston having a control end, said control end being in fluid communication with fluid from said one of said control pressure ports having the highest pressure.

5. An apparatus for controlling pressurized fluid flow through a power steering system for a motor vehicle of the type having a power cylinder, a piston mounted in the power cylinder and dividing the power cylinder into first and second chambers, said system having a pressurized fluid source having an input and an output, said apparatus comprising:

a rotary valve assembly comprising:

a housing;

a rotary input member mounted to said housing;

a pair of input flow control valves, each of said pair of input valves having an inlet and an outlet, each inlet of said pair of input valves being fluidly connected to said output of said pressurized fluid source, one outlet of said pair of flow control valves fluidly connected to the first chamber of the power cylinder of another of said pair of flow control valves fluidly connected to the second chamber of the power cylinder;

a pair of parasitic valves, each having an orifice fluidly connected to one of said pair of outlets of said flow control valves and permitting fluid flow between said pair of outlets when said rotary valve is in a center position;

a pair of pressure control valves, each of said pair of pressure control valves having an inlet and an outlet, each inlet of said pair of pressure control valves being fluidly connected to respective outlets of said pair of flow control valves, said outlets of said pressure control valve being fluidly connected to said inlet of said pressurized fluid source, wherein one of said flow control valves variably opens, said other of said output pressure control valves variably closes and said pair of parasitic valves close progressively with torque applied to said rotary input member to create a differential pressure between said first and second chambers of said power cylinder;

means for measuring a differential pressure between a pair of control pressure input ports and for providing a signal representative of the instant differential pressure value between said pair of input ports;

means for fluidly coupling one port of said pair of input ports of said measuring means to one of said outlets of said pair of flow control valves having the lowest instant pressure value;

means for fluidly coupling an other port of said pair of input ports of said measuring means to said inlet of said pressurized fluid source; and means for selectively driving said source of pressurized fluid in response to said signal.

6. The apparatus of claim 5, wherein said rotary input member comprises a pair of primary input grooves and a supplemental input groove, said supplemental input groove being fluidly connected to said pair of input ports of said measuring means, said pair of primary input grooves being connected to said pair of flow control valves.

7. The apparatus of claim 5, wherein said pair of input ports of said differential pressure measuring means comprises a pair of control pressure ports in fluid communication with respective ones of said flow control valves.

8. The apparatus of claim 7 comprising a pressure control piston having a control end, said control end being in fluid communication with fluid from said control pressure ports having the lowest pressure.

* * * * *